United States Patent
Kataoka et al.

(10) Patent No.: US 9,355,192 B2
(45) Date of Patent: May 31, 2016

(54) COLLATION CONTROL DEVICE, AND COLLATION CONTROL METHOD

(71) Applicant: FUJITSU LIMITED, Kawasaki-shi, Kanagawa (JP)

(72) Inventors: Masahiro Kataoka, Tama (JP); Takahiro Murata, Yokohama (JP); Takafumi Ohta, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 14/263,430

(22) Filed: Apr. 28, 2014

(65) Prior Publication Data

US 2014/0236993 A1    Aug. 21, 2014

Related U.S. Application Data

(63) Continuation of application No. PCT/JP2011/075514, filed on Nov. 4, 2011.

(51) Int. Cl.
*G06F 17/30* (2006.01)

(52) U.S. Cl.
CPC .... *G06F 17/30985* (2013.01); *G06F 17/30091* (2013.01)

(58) Field of Classification Search
USPC ................ 707/741, 772, 769, 758
See application file for complete search history.

(56) References Cited

U.S. PATENT DOCUMENTS

| | | | |
|---|---|---|---|
| 5,590,317 A | 12/1996 | Iguchi et al. | |
| 5,870,750 A * | 2/1999 | Oyama | G06F 17/30985 707/741 |
| 7,882,083 B2 | 2/2011 | Kataoka et al. | |
| 2001/0022792 A1 | 9/2001 | Maeno et al. | |
| 2006/0165305 A1* | 7/2006 | Hasebe | G06K 9/00234 382/243 |
| 2008/0098024 A1 | 4/2008 | Kataoka et al. | |
| 2009/0299973 A1 | 12/2009 | Kataoka et al. | |
| 2010/0131475 A1 | 5/2010 | Kataoka et al. | |
| 2011/0161357 A1 | 6/2011 | Kataoka et al. | |

FOREIGN PATENT DOCUMENTS

| | | |
|---|---|---|
| JP | 05-324730 | 12/1993 |
| JP | 11-110187 | 4/1999 |
| JP | 2000-216685 | 8/2000 |
| JP | 2011-138230 | 7/2011 |

(Continued)

OTHER PUBLICATIONS

Extended European Search Report dated Jun. 8, 2015 for corresponding European Patent Application No. 11875183.3, 8 pages.

(Continued)

*Primary Examiner* — Hung T Vy
(74) *Attorney, Agent, or Firm* — Fujitsu Patent Center

(57) ABSTRACT

A computer receives a retrieval request with a retrieval character string, adds control information to a region corresponding to code information included in a management region used for extending encoded data when an extension result of the code information matches a first character of the retrieval character string when the encoded data to be retrieved is sequentially extended in response to the retrieval request, and performs collation processing between the retrieval character string and character string information corresponding to data of the extension result of the code information when the control information is added to a partial region corresponding to code information to be extended in the extension.

5 Claims, 15 Drawing Sheets

(56) References Cited

FOREIGN PATENT DOCUMENTS

WO 2006-123448 11/2006
WO 2008-142800 11/2008

OTHER PUBLICATIONS

Amir, Amihood, "Let Sleeping Files Lie: Pattern Matching in Z-Compressed Files", Journal of Computer and System Sciences, vol. 52, pp. 299-307 (1996), Article No. 0023. [online] [retrieved on Nov. 25, 2011] Retrieved from the Internet: <URL:http://tandem.bu.edu/papers/let.sleeping.files.lie.jcss.1996.pdf>.

International Search Report, mailed in connection with PCT/JP2011/075514 and mailed Dec. 6, 2011.

* cited by examiner

FIG.4

| POINTER TO PARENT |
| --- |
| POINTER TO CHILD |
| POINTER TO BROTHER |
| CHARACTER CODE |
| COMPRESSION CODE SEQUENCE |
| COLLATION FLAG |
| REPLACEMENT FLAG |
| POINTER TO REPLACEMENT TABLE |

| CHARACTER DATA | CHARACTER DATA NUMBER OF APPEARANCES | NUMBER OF APPEARANCE FILES |
| --- | --- | --- |
| A | 1238 | 230 |
| ⋮ | ⋮ | ⋮ |

FIG.6

| ADDRESS | REPLACEMENT CHARACTER STRING |
|---|---|
| P1 | <color>bit</color> |
| P2 | <color>tall</color> |
| | ⋮ |

FIG.7

| |
|---|
| POINTER TO PARENT : i |
| POINTER TO CHILD : - |
| POINTER TO BROTHER : g |
| CHARACTER CODE : 74h |
| COMPRESSION CODE SEQUENCE : 104h |
| COLLATION FLAG : 0 |
| REPLACEMENT FLAG : 0 |
| POINTER TO REPLACEMENT TABLE : - |

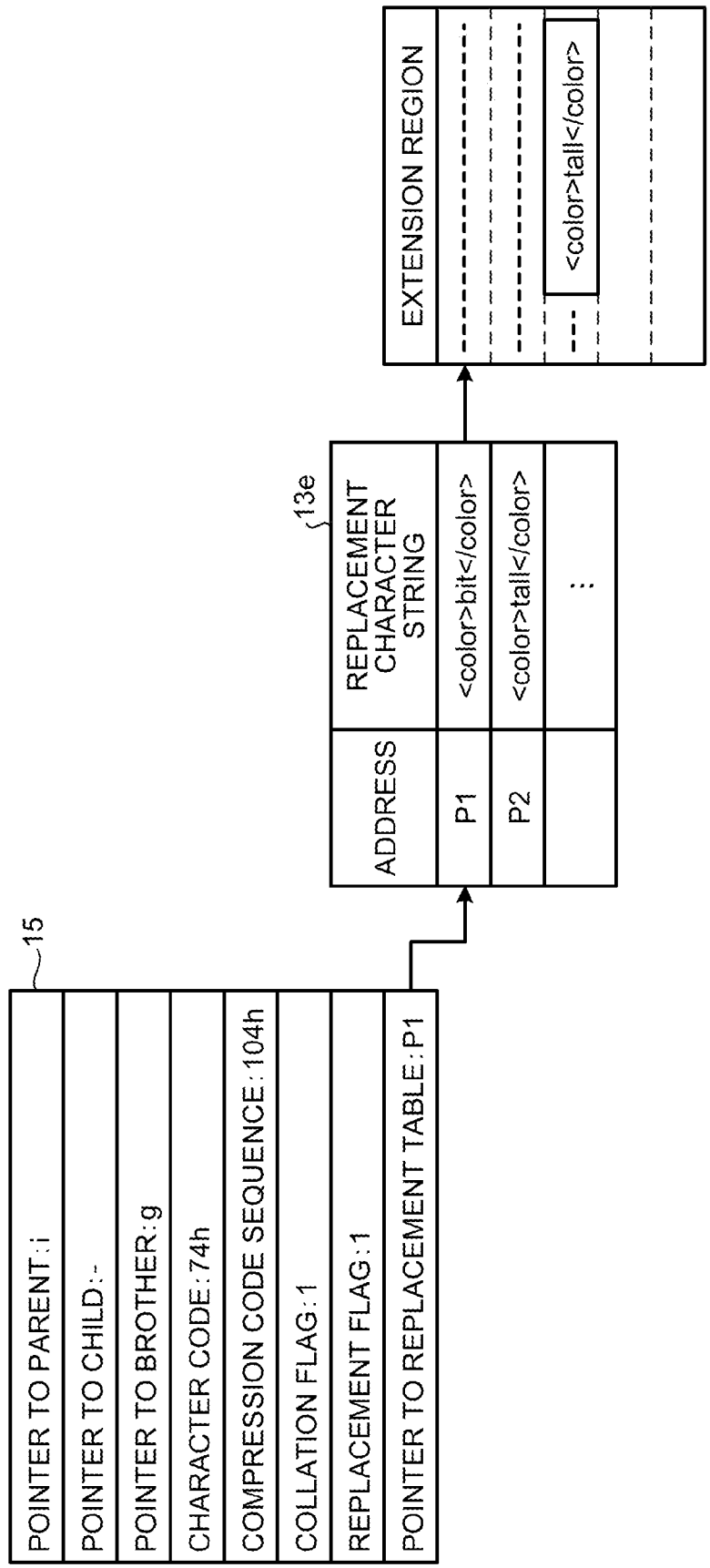

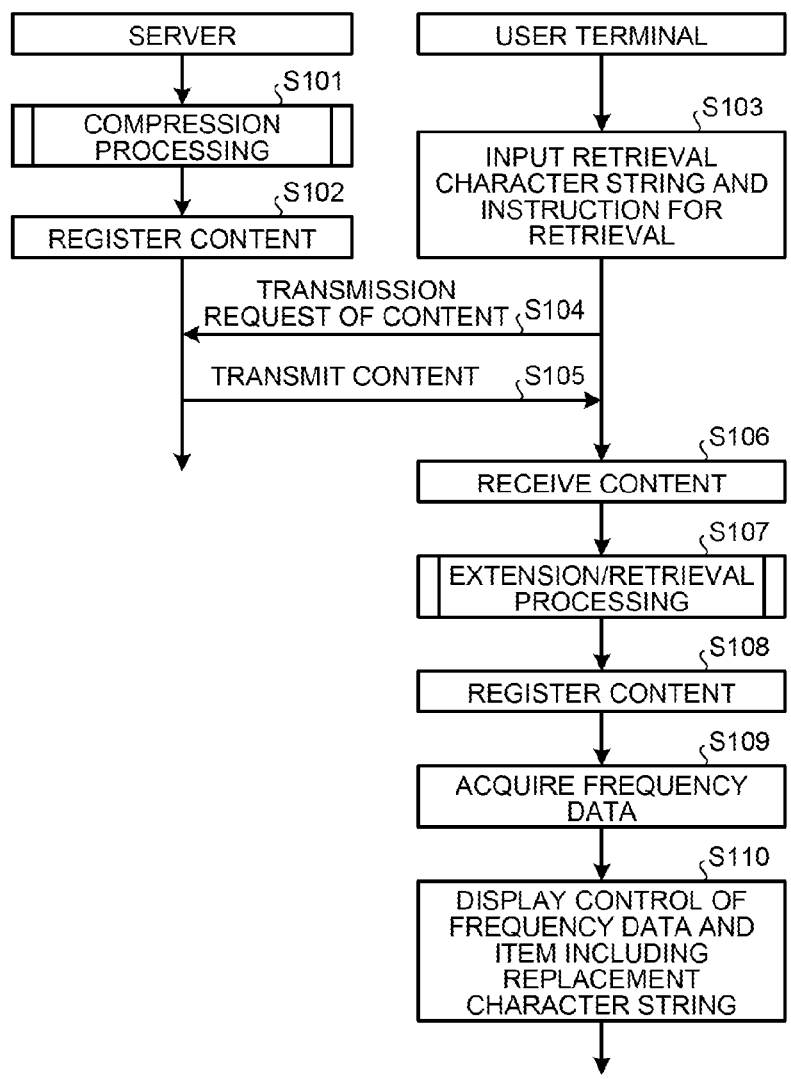

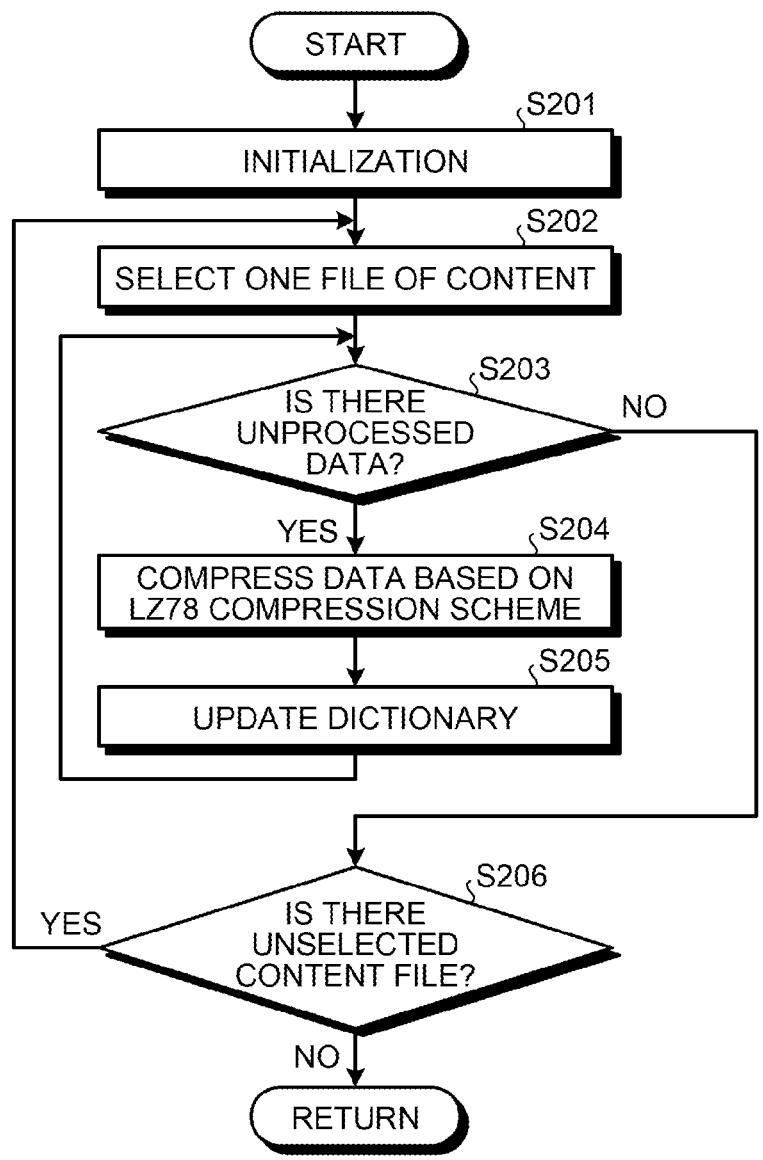

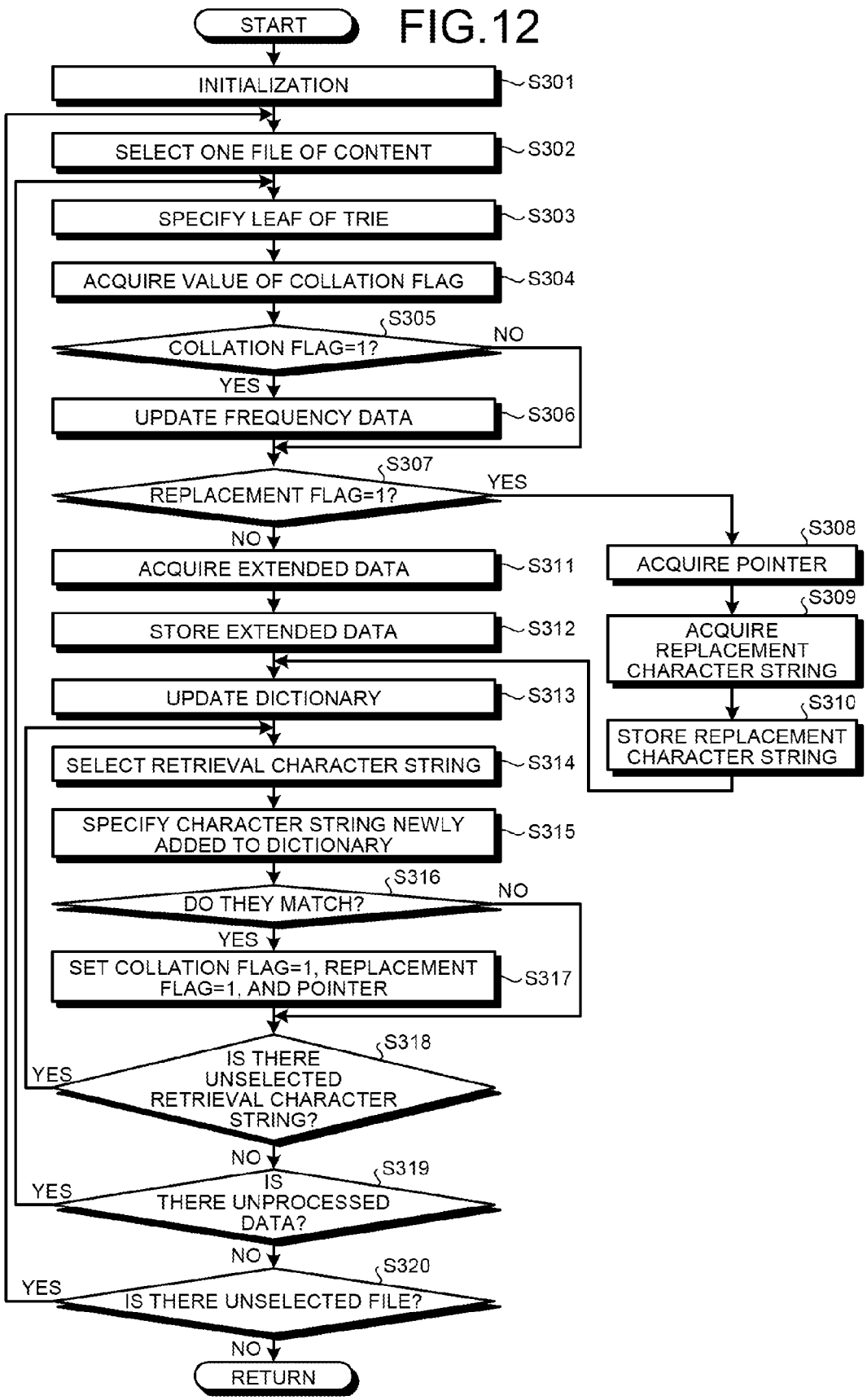

COLLATION CONTROL DEVICE, AND COLLATION CONTROL METHOD

CROSS-REFERENCE TO RELATED APPLICATION

This application is a continuation application of International Application PCT/JP2011/075514, filed on Nov. 4, 2011, and designating the U.S., the entire contents of which are incorporated herein by reference.

FIELD

The present invention relates to a collation control program, a collation control device, and a collation control method.

BACKGROUND

Conventionally, there have been devices that compress digital content and transmit the compressed digital content. For example, conventional devices transmit digital content compressed in an electronic publication (EPUB) format to a user terminal such as a personal computer (PC) or a cellular telephone. Examples of the digital content include video, music, books, and dictionaries. The compressed digital content is extended in the user terminal. Then the extended digital content is reproduced in the user terminal. In the user terminal, when a user wishes to view an item including a predetermined retrieval character string among items included in the digital content, the retrieval character string is searched in the digital content.
Patent Literature 1: Japanese Laid-open Patent Publication No. 11-110187
Patent Literature 2: Japanese Laid-open Patent Publication No. 2000-216685
Patent Literature 3: International Publication Pamphlet No. WO 2006/123448

SUMMARY

However, when retrieval processing is performed for data such as compressed digital content, extension processing and the retrieval processing are both performed, so that processing time becomes long.

According to an aspect of an embodiment, a non-transitory computer-readable recording medium stores a program. The program causes a computer to execute a collation control process. The process includes receiving a retrieval request with a retrieval character string, adding control information to a region corresponding to code information included in a management region used for extending encoded data when an extension result of the code information matches a first character of the retrieval character string when the encoded data to be retrieved is sequentially extended in response to the retrieval request, and performing collation processing between the retrieval character string and character string information corresponding to data of the extension result of the code information when the control information is added to a partial region corresponding to code information to be extended in the extension.

The object and advantages of the invention will be realized and attained by means of the elements and combinations particularly pointed out in the claims.

It is to be understood that both the foregoing general description and the following detailed description are exemplary and explanatory and are not restrictive of the invention.

According to an aspect, it is possible to reduce processing time of retrieval processing for compressed data.

BRIEF DESCRIPTION OF DRAWINGS

FIG. 4 is a diagram illustrating an example of a leaf structure in the trie.
FIG. 5 is a diagram illustrating an example of frequency data.
FIG. 6 is a diagram illustrating an example of a replacement table.
FIG. 7 is a diagram illustrating an example of the leaf structure in the trie.
FIG. 8 is a diagram for explaining processing performed by a user terminal.
FIG. 9 is a diagram for explaining an example of the processing performed by the user terminal.
FIG. 10 is a sequence diagram of a system according to the first embodiment.
FIG. 11 is a flowchart illustrating a procedure of compression processing according to the first embodiment.
FIG. 12 is a flowchart illustrating a procedure of extension/retrieval processing according to the first embodiment.

DESCRIPTION OF EMBODIMENTS

The following describes embodiments of a retrieval program, a retrieval device, and a retrieval method disclosed in the present application in detail based on drawings. These embodiments do not limit the present disclosure. The embodiments may be appropriately combined so far as pieces of processing content thereof are not incompatible with each other. The retrieval program, the retrieval device, and the retrieval method are an example of a collation control program, a collation control device, and a collation control method, respectively.

First Embodiment

Figure 1:
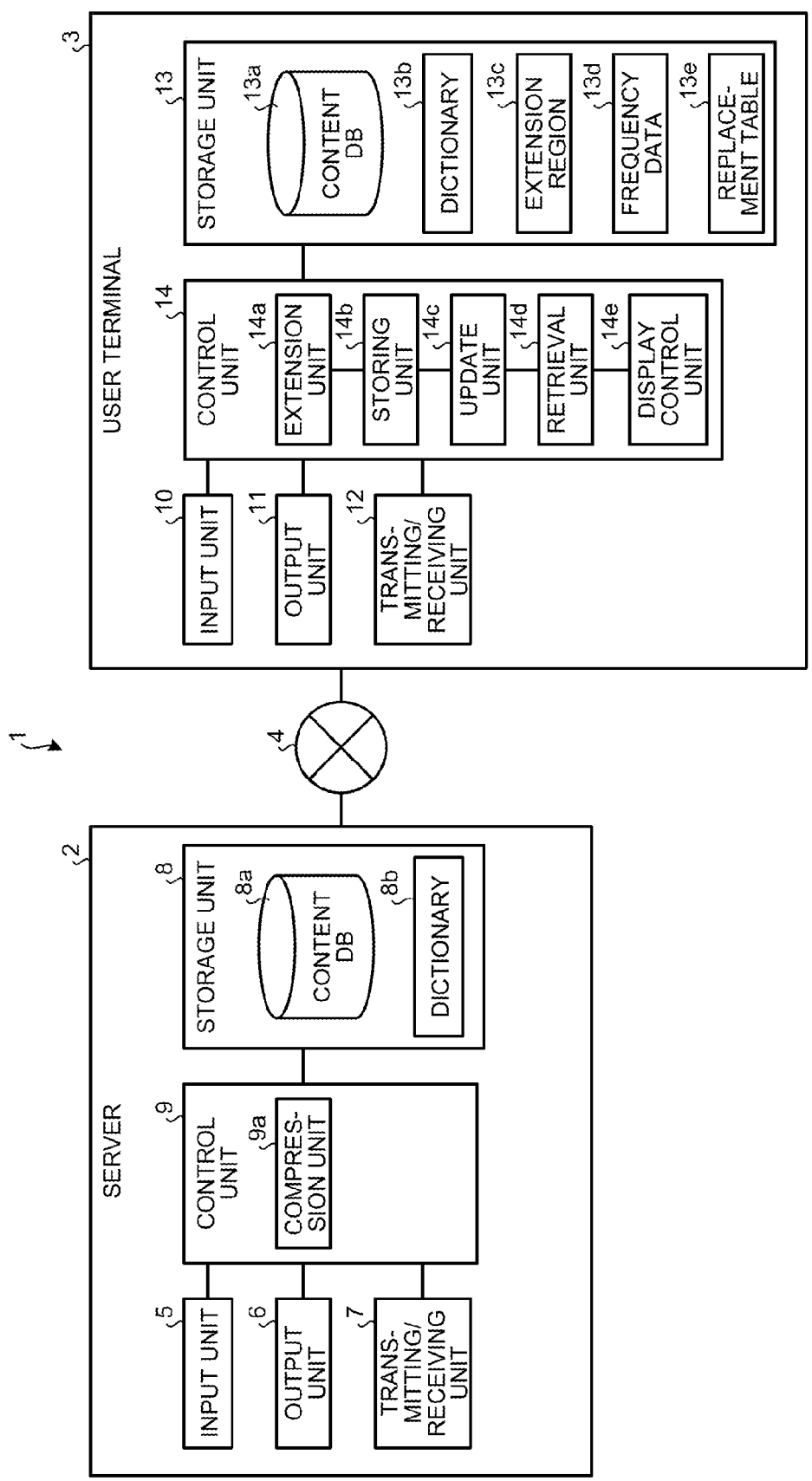
FIG. 1 is a diagram illustrating a configuration example of a system according to a first embodiment.

Configuration Example of System 1
The following describes a system according to a first embodiment. FIG. 1 is a diagram illustrating a configuration example of the system according to the first embodiment. The system 1 according to the present embodiment includes a server 2 and a user terminal 3. The server 2 and the user terminal 3 are connected to each other so as to transmit/receive data. In the example of FIG. 1, the server 2 and the user terminal 3 are connected to each other via an Internet 4. The server 2 and the user terminal 3 may be wirelessly connected to each other. The server 2 compresses file data of a plurality of pieces of digital content such as dictionaries and electronic books. The server 2 transmits encrypted file data of the pieces of digital content to the user terminal 3 via the Internet 4. The user terminal 3 retrieves a retrieval character string included in each file while extending the received file data of the electronic books, counts appearance frequency and the number of appearance files of the retrieval character string, and displays an item including the retrieval character string of each file.

The server 2 includes an input unit 5, an output unit 6, a transmitting/receiving unit 7, a storage unit 8, and a control unit 9.

The input unit 5 inputs various pieces of information to the control unit 9. The input unit 5, for example, receives the digital content from a user, and inputs the received digital content to the control unit 9. The input unit 5 receives an instruction for performing compression processing described later from the user, and inputs the received instruction to the control unit 9. Examples of a device serving as the input unit 5 include an operation receiving device such as a mouse and a keyboard.

The output unit 6 outputs various pieces of information. The output unit 6, for example, displays an operating state of the server 2. Examples of a device serving as the output unit 6 include a display device such as a liquid crystal display (LCD) and a cathode ray tube (CRT).

The transmitting/receiving unit 7 is a communication interface for communication between the server 2 and the user terminal 3. For example, when receiving a transmission request of a digital content file registered in a content database (data base) from the user terminal 3 via the Internet 4, the transmitting/receiving unit 7 transmits the received transmission request to the control unit 9. Hereinafter, the database is abbreviated to "DB". When receiving a digital content file registered in a content DB 8a described later from the control unit 9, the transmitting/receiving unit 7 transmits the received digital content file to the user terminal 3 via the Internet 4.

The storage unit 8 stores therein various pieces of information. The storage unit 8, for example, stores therein the content DB 8a and a dictionary 8b.

Figure 2:
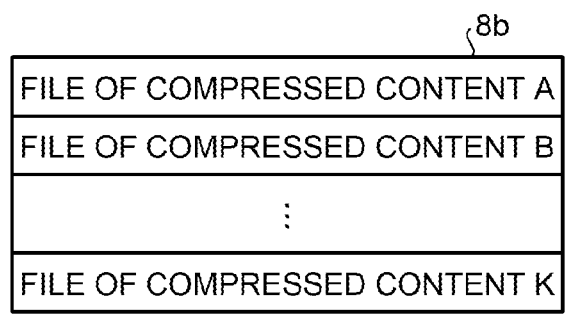
FIG. 2 is a diagram illustrating an example of a content DB.

A file of the compressed digital content is registered in the content DB 8a. For example, the digital content file compressed by a compression unit 9a described later is registered in the content DB 8a. FIG. 2 is a diagram illustrating an example of the content DB. The example of FIG. 2 illustrates a case in which files of pieces of compressed digital content A to K are registered in the content DB 8a. Each of the digital content files registered in the content DB 8a is transmitted to the user terminal 3 corresponding to an instruction from the user terminal 3.

Figure 3:
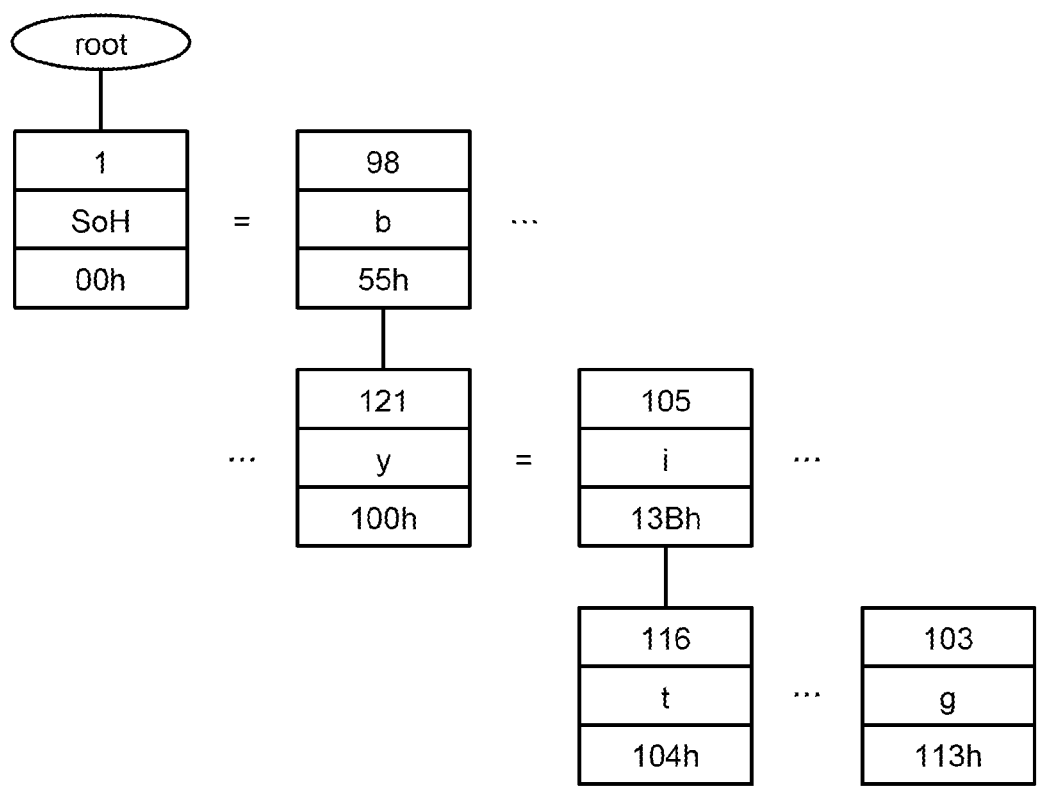
FIG. 3 is a diagram illustrating an example of a trie.

The dictionary 8b is a dynamic dictionary used in an LZ78 compression scheme. In the LZ78 compression scheme, a dynamic dictionary represented by a trie is used to compress and extend files. A reference number and a character code of a character are stored in a leaf and a node of the trie. FIG. 3 is a diagram illustrating an example of the trie. In the example of FIG. 3, a reference number of a character string "bit" is "104" in hexadecimal. In the example of FIG. 3, the character string "bit" can be compressed by using the reference number "104" as a compression code sequence of the character string "bit". In the example of FIG. 3, the data can be extended by replacing the compressed file data "104" with the character string "bit".

For example, the storage unit 8 is a semiconductor memory device such as a flash memory, or a storage device such as a hard disk and an optical disc. The storage unit 8 is not limited to the above-described type of storage device, and may be a random access memory (RAM) or a read only memory (ROM).

The control unit 9 includes an internal memory for storing therein control data or a computer program that defines various processing procedures to perform various types of processing. As illustrated in FIG. 1, the control unit 9 includes the compression unit 9a.

The compression unit 9a compresses a file of digital content input from the input unit 5. The compression unit 9a, for example, compresses each of the digital content files using the dictionary 8b based on the LZ78 compression scheme, updates the dictionary 8b, and registers each of the compressed files in the content DB 8a for each piece of the digital content.

The user terminal 3 includes an input unit 10, an output unit 11, a transmitting/receiving unit 12, a storage unit 13, and a control unit 14.

The input unit 10 inputs various pieces of information to the control unit 14. The input unit 10, for example, receives a retrieval character string and an instruction for performing extension/retrieval processing described later from the user, and inputs the received retrieval character string and the instruction to the control unit 14. The input unit 10, for example, can receive a character string such as "bit" or a character such as "rabbit" as the retrieval character string. Examples of a device serving as the input unit 10 include an operation receiving device such as a mouse and a keyboard.

The output unit 11 outputs various pieces of information. The output unit 11, for example, displays an item including a replacement character string, and the number of appearances and the number of appearance files of each character represented by frequency data 13d described later using a display control unit 14e described later. Examples of a device serving as the output unit 11 include a display device such as a liquid crystal display (LCD) and a cathode ray tube (CRT).

The transmitting/receiving unit 12 is a communication interface for communication between the user terminal 3 and the server 2. For example, when receiving a transmission request of a digital content file registered in the content DB from the control unit 14, the transmitting/receiving unit 12 transmits the received transmission request to the server 2 via the Internet 4. When receiving the digital content file registered in the content DB 8a from the server 2, the transmitting/receiving unit 12 transmits the received file to the control unit 14.

The storage unit 13 stores therein various pieces of information. The storage unit 13, for example, stores therein a content DB 13a, a dictionary 13b, an extension region 13c, the frequency data 13d, and a replacement table 13e.

Each file of the digital content extended by an extension unit 14a described later is registered in the content DB 13a.

The dictionary 13b is a dynamic dictionary represented by a trie used in the LZ78 compression scheme. The dictionary 13b is updated by the extension unit 14a described later. Herein, the following describes an example of a leaf structure in the trie of the present embodiment. FIG. 4 is a diagram illustrating an example of the leaf structure in the trie. In the example of FIG. 4, the leaf structure of the trie includes a pointer to a parent node, a pointer to a child leaf or node, and a pointer to a brother leaf or node in the same generation. In the example of FIG. 4, the leaf structure in the trie includes items such as a character code, a compression code sequence of a character string from a root to the leaf in the trie, a collation flag, a replacement flag, and a pointer to the replacement table.

Among these, the collation flag is a flag for indicating that collation is completed. When the character string from the root to the leaf in the trie is the retrieval character string, a value indicating that the flag is ON, for example "1", is registered in the collation flag by a storing unit 14b described later. In an initial state, a value indicating that the flag is OFF, for example "0", is registered in the collation flag.

The replacement flag is a flag for replacing compressed data to be extended with a replacement character string when a character string from the root of the trie to a leaf in which the compressed data to be extended is stored as a compression code sequence is the retrieval character string. When the character string from the root to the leaf of the specified trie is the retrieval character string, a value indicating that the flag is ON, for example "1", is registered in the replacement flag by the storing unit 14b described later. In the initial state, a value indicating that the flag is OFF, for example "0", is registered in the replacement flag. As an item of a pointer to the replacement table, the storing unit 14b registers a pointer that points to a position at which the replacement character string, which is registered in the replacement table 13e described later, is registered. When the collation flag and the replacement flag are ON, it is indicated that the character string to be obtained by extending the compression code sequence registered in the leaf of the trie is the retrieval character string. That is, when the collation flag and the replacement flag are ON, it is indicated that the compression code sequence corresponding to the retrieval character string is registered in the leaf of the trie.

The extension region 13c is a storage region in which data extended by the extension unit 14a described later is stored. The storage region represented by the extension region 13c of the storage unit 13 is also referred to as an extension buffer.

The number of appearances and the number of appearance files of each character are registered by an update unit 14c described later to update the frequency data 13d. FIG. 5 is a diagram illustrating an example of the frequency data. The example of FIG. 5 illustrates a case in which the number of appearances of a character "A" is "1238" in all files of a plurality of pieces of digital content, and the number of files in which the character "A" appears is "230".

In the replacement table 13e, the storing unit 14b described later registers a replacement character string obtained by converting the retrieval character string to a predetermined character string. FIG. 6 is a diagram illustrating an example of the replacement table. The example of FIG. 6 illustrates a case in which a replacement character string, which is the retrieval character string "bit" to which tags "<color>" and "</color>" are given, is registered in the replacement table 13e. The character string between the tags "<color>" and "</color>" is displayed in a predetermined color, for example, red and the like. That is, the "bit" illustrated in the example of FIG. 6 is highlighted in red on the display device.

For example, the storage unit 13 is a semiconductor memory device such as a flash memory, or a storage device such as a hard disk and an optical disc. The storage unit 13 is not limited to the above-described type of storage device, and may be a random access memory (RAM) or a read only memory (ROM).

The control unit 14 includes an internal memory for storing therein control data or a computer program that defines various processing procedures to perform various types of processing. As illustrated in FIG. 1, the control unit 14 includes the extension unit 14a, the storing unit 14b, the update unit 14c, a retrieval unit 14d, and the display control unit 14e.

The extension unit 14a extends the compressed character string to be extended using the dictionary 13b represented by the leaf in the trie, and updates the dictionary 13b by adding to the trie a new leaf in which a combination of the compression code sequence and a character string, which includes a newly extended character string and is not registered in the dictionary 13b, is registered, corresponding to content registered in the dictionary 13b and the extended character string.

A specific example will be described. First, the extension unit 14a initializes the dictionary 13b. When the initialization is performed, in the dictionary 13b, a predetermined number of types of characters, for example, 256 types of characters, and a compression code sequence corresponding to the characters are registered.

The extension unit 14a acquires a plurality of pieces of digital content transmitted from the server 2. The extension unit 14a selects an unselected file as a file to be extended from among the acquired digital content files. Then the extension unit 14a refers to the dictionary 13b and specifies a leaf of the trie in which unprocessed compressed data of the file to be extended is registered in an item of "compression code sequence". FIG. 7 is a diagram illustrating an example of the leaf structure in the trie. The example of FIG. 7 illustrates the leaf structure in the trie in which a compression code sequence "104h" is registered in the item of "compression code sequence". In the example of FIG. 7, when the unprocessed compressed data of the file to be extended is "104h", the extension unit 14a specifies the leaf structure in the trie illustrated in FIG. 7 as a leaf structure in the trie in which the compression code sequence "104h" is registered in the item of "compression code sequence". The structure illustrated in the example of FIG. 7 is a structure corresponding to a character "t" in the trie illustrated in FIG. 3 described above. In the example of FIG. 3, a node corresponding to a character "i" is a "parent" of a leaf corresponding to the character "t", so that a pointer to the node corresponding to the character "i" is registered in an item of "pointer to parent" in the example of FIG. 7. In the example of FIG. 3, there is no leaf or a node serving as a "child" of the leaf corresponding to the character "t", so that no pointer is registered in an item of "pointer to child" in the example of FIG. 7. In the example of FIG. 3, a node corresponding to a character "g" is a "brother" of the leaf corresponding to the character "t", so that a pointer to a leaf corresponding to the character "g" is registered in an item of "pointer to brother" in the example of FIG. 7.

In the example of FIG. 7, a character code of the character "t" is "74h", so that "74h" is registered in an item of "character code". In the example of FIG. 7, "0" is registered in an item of "collation flag" as an initial state. In the example of FIG. 7, "0" is registered in an item of "replacement flag" as the initial state. In the example of FIG. 7, no pointer is registered in an item of "pointer to replacement table".

If the retrieval unit 14d described later determines that a value of the replacement flag is not "1", that is, "0", the extension unit 14a refers to the dictionary 13b and acquires data combining the character codes of respective character strings from the root of the trie to the specified leaf of the trie in the order of the character strings, as extended data. Subsequently, the extension unit 14a stores the acquired extended data in the extension region 13c.

If the retrieval unit 14d described later determines that the value of the replacement flag is "1", the extension unit 14a refers to the dictionary 13b and acquires a pointer to the replacement table registered in the specified leaf of the trie. FIG. 8 is a diagram for explaining the processing performed by the user terminal. A leaf 15 in the example of FIG. 8 illustrates a case in which the storing unit 14b described later registers "1" in the item of the collation flag, "1" in the item of the replacement flag, and "P1" in the item of the pointer to the replacement table, in the leaf structure illustrated in the example of FIG. 7. When the leaf 15 illustrated in the example of FIG. 8 is specified, the extension unit 14a acquires "P1" as the pointer to the replacement table. Then the extension unit 14a acquires the replacement character string in the replacement table 13e indicated by the acquired pointer to the replacement table. In the example of FIG. 8, when the pointer to the replacement table "P1" is acquired, the extension unit 14a acquires the replacement character string "<color>bit</color>" registered in the replacement table 13e indicated by "P1". Subsequently, the extension unit 14a stores the acquired replacement character string in the extension region 13c. In the example of FIG. 8, when the replacement character string "<color>bit</color>" is acquired, the extension unit 14a stores "<color>bit</color>" in the extension region 13c. In this way, when the value of the replacement flag is "1", that is, a character string to be obtained by extending the compression code sequence is the retrieval character string, the extension unit 14a does not extend the compression code sequence and replaces the compression code sequence with the replacement character string.

As described above, if the retrieval unit 14d described later determines that the value of the replacement flag is "1", the extension unit 14a does not extend the compression code sequence and replaces the compression code sequence with the replacement character string. Accordingly, when the value of the replacement flag is "1", that is, the character string to be obtained by extending the compression code sequence is the retrieval character string, the user terminal 3 does not extend the compression code sequence and replaces the compression code sequence with the replacement character string, so that speed of the retrieval processing is accelerated.

Based on the LZ78 compression scheme, the extension unit 14a updates the dictionary 13b by adding to the trie a new leaf in which a combination of the compression code sequence and the character string, which includes a newly extended character string and is not registered in the dictionary 13b, is registered, corresponding to the content registered in the dictionary 13b and the extended character string.

Each time a new leaf is added to the trie, the extension unit 14a determines whether a character string registered in the new leaf matches the retrieval character string input from the input unit 10. When a plurality of retrieval character strings are input from the input unit 10, the extension unit 14a determines whether the character string registered in the new leaf matches each of the retrieval character strings. According to such a determination result, the storing unit 14b performs processing described later.

The extension unit 14a stores the digital content file extended in the extension region 13c in the content DB 13a for each file.

The storing unit 14b stores therein various pieces of information. For example, each time the retrieval character string is input from the input unit 10, the storing unit 14b generates a replacement character string in which the input retrieval character string is highlighted, and stores the generated replacement character string in the replacement table 13e. Examples of a method for generating the replacement character string employed by the storing unit 14b include a method for giving the tags "<color>" and "</color>" to the retrieval character string.

When the new leaf is added to the trie and a new character string registered in the new leaf matches the retrieval character string, the storing unit 14b stores, in the storage unit 13, information indicating that the compression code sequence corresponding to the retrieval character string is registered. Examples of such information include "1" set to the collation flag and the replacement flag. For example, if the extension unit 14a determines that the character string registered in the new leaf matches the retrieval character string input from the input unit 10, the storing unit 14b sets "1" to an item of the collation flag in the specified leaf structure of the trie. If the extension unit 14a determines that the character string registered in the new leaf matches the retrieval character string input from the input unit 10, the storing unit 14b performs processing as follows. That is, the storing unit 14b sets "1" to the item of the replacement flag, and sets, to the item of the pointer to the replacement table in the specified leaf structure of the trie, a pointer that points to the replacement character string registered in the replacement table 13e corresponding to the retrieval character string.

FIG. 9 is a diagram for explaining data used for processing of the user terminal. The example of FIG. 9 illustrates a case in which the storing unit 14b sets "1" to the collation flag when the extension unit 14a specifies the leaf structure of the trie illustrated in FIG. 7. The example of FIG. 9 illustrates a case in which the storing unit 14b sets "1" to the replacement flag when the extension unit 14a specifies the leaf structure of the trie illustrated in FIG. 7. The example of FIG. 9 also illustrates a case in which the storing unit 14b sets "P1" to the pointer to the replacement table when the extension unit 14a specifies the leaf structure of the trie illustrated in FIG. 7.

The update unit 14c updates the frequency data 13d. For example, when the retrieval unit 14d described later determines that the value of the collation flag in the specified leaf of the trie is "1", the update unit 14c performs processing as follows because the character string to be obtained by extending the unprocessed compressed data is the retrieval character string. That is, the update unit 14c increments, by one, a value of the number of appearances of the retrieval character string in the frequency data 13d, and increments, by one, a value of the number of appearance files of the retrieval character string in the file to be extended. However, if the determination that the value of the collation flag is "1" for each character is the first determination, the update unit 14c increments, by two, the value of the number of appearances of the retrieval character string in the frequency data 13d, and increments, by two, the value of the number of appearance files of the retrieval character string in the file to be extended. This is because, although the determination on whether the value of the collation flag is "1" is performed with respect to the compressed data of the retrieval character string before extension, the retrieval character string is already extended when it is determined that the value of the collation flag is "1". That is, two retrieval character strings appear when the first determination is made that the value of the collation flag is "1".

The retrieval unit 14d acquires the value of the collation flag in the leaf structure of the trie specified by the extension unit 14a. Then the retrieval unit 14d determines whether the value of the collation flag is "1". If the value of the collation flag is "1", the retrieval character string is retrieved from the digital content file, and it is determined that the collation is completed. That is, the retrieval unit 14d retrieves whether there is the compression code sequence registered in the leaf of the trie of which value of the collation flag is "1", in the unprocessed compressed data of the file to be extended. As described above, if the retrieval unit 14d determines that the value of the collation flag is "1", the update unit 14c updates the frequency data 13d indicating the number of retrieval character strings included in the file. Accordingly, with the user terminal 3, the speed of the retrieval processing is accelerated as compared to a case of extending the file of the compressed digital content and scanning the extended file data for each predetermined number of characters to retrieve the retrieval character string.

The retrieval unit 14d also acquires the value of the replacement flag in the leaf structure of the trie specified by the extension unit 14a. Then the retrieval unit 14d determines whether the value of the replacement flag is "1". If the value of the replacement flag is "1", it is determined that the compression code sequence of the specified leaf of the trie is replaced with the replacement character string. As described above, if the retrieval unit 14d determines that the value of the replacement flag is "1", the extension unit 14a does not extend the compression code sequence and replaces the compression code sequence with the replacement character string. In this way, when the character string to be obtained by extending the compressed data to be extended is the retrieval character string, the user terminal 3 omits the processing of extending the compression code sequence and replaces the compression code sequence with the replacement character string, so that the speed of the retrieval processing is accelerated.

The display control unit 14e controls a display screen displayed on the display device of the output unit 11. The display control unit 14e, for example, causes the display device of the output unit 11 to display an item including the replacement character string stored in the extension region 13c. The display control unit 14e also causes the display device of the output unit 11 to display the number of appearances and the number of appearance files of each character represented by the frequency data 13d.

The control unit 14 includes an integrated circuit such as an application specific integrated circuit (ASIC) and a field programmable gate array (FPGA). The control unit 14 may include an electronic circuit such as a central processing unit (CPU) and a micro processing unit (MPU).

Processing Flow

Next, the following describes a processing flow of the system 1 according to the present embodiment. FIG. 10 is a sequence diagram of the system according to the first embodiment.

As illustrated in FIG. 10, the server 2 performs compression processing described later (Step S101). The server 2 registers the file of the compressed digital content in the content DB 8a (Step S102).

If the user terminal 3 receives the retrieval character string and an instruction for performing extension/retrieval processing described later from the user (Step S103), the user terminal 3 transmits a transmission request of the digital content file to the server 2 (Step S104). If the server 2 receives the transmission request of the digital content file, the server 2 transmits the digital content file registered in the content DB 8a to the user terminal 3 (Step S105).

If the user terminal 3 receives the digital content file (Step S106), the user terminal 3 performs the extension/retrieval processing described later (Step S107). The user terminal 3 registers the extended digital content file in the content DB 13a (Step S108). The user terminal 3 acquires frequency data from the storage unit 13 (Step S109). The user terminal 3 causes the display device to display an item including the replacement character string stored in the extension region 13c, and the number of appearances and the number of appearance files of each character represented by the frequency data (Step S110).

Next, the following describes a processing flow of the server 2 according to the present embodiment. FIG. 11 is a flowchart illustrating a procedure of compression processing according to the first embodiment. The compression processing may be performed at various timings. For example, the compression processing may be performed when the digital content is input from the input unit 5.

As illustrated in FIG. 11, the compression unit 9a initializes the dictionary 8b (Step S201). The compression unit 9a selects one of the digital content files input from the input unit 5 (Step S202). The compression unit 9a determines whether there is data that is not compressed in the selected file data of the digital content (Step S203). If there is the data that is not compressed (Yes at Step S203), the compression unit 9a refers to the dictionary 8b and compresses the data based on the LZ78 compression scheme (Step S204). The compression unit 9a updates the dictionary 8b (Step S205), and the process returns to Step S203.

If there is no data that is not compressed (No at Step S203), the compression unit 9a determines whether there is a file that is not selected at Step S202 (Step S206). If there is an unselected file (Yes at Step S206), the process returns to Step S202, and the compression unit 9a selects the unselected file to perform subsequent processing again. If there is no unselected file (No at Step S206), a processing result is stored in the internal memory of the control unit 9 and the process is returned.

Next, the following describes a processing flow of the user terminal 3 according to the present embodiment. FIG. 12 is a flowchart illustrating a procedure of extension/retrieval processing according to the first embodiment.

As illustrated in FIG. 12, the extension unit 14a initializes the dictionary 13b (Step S301). The extension unit 14a selects an unselected file from among the compressed digital content files as a file to be extended (Step S302). The extension unit 14a refers to the dictionary 13b and specifies a leaf of the trie in which the unprocessed compressed data of the file to be extended is registered in the item of "compression code sequence" (Step S303).

The retrieval unit 14d acquires values of the collation flag and the replacement flag in the leaf structure of the trie specified by the extension unit 14a (Step S304). The retrieval unit 14d determines whether the value of the collation flag is "1" (Step S305). If the value of the collation flag is "1" (Yes at Step S305), the update unit 14c updates the value of the number of appearances and the value of the number of appearance files of the retrieval character string in the frequency data 13d (Step S306).

The retrieval unit 14d determines whether the value of the replacement flag is "1" (Step S307). If the value of the replacement flag is "1" (Yes at Step S307), the extension unit 14a refers to the dictionary 13b and acquires the pointer to the replacement table in the specified leaf of the trie (Step S308). The extension unit 14a acquires, from the replacement table 13e, the replacement character string pointed by the acquired pointer to the replacement table (Step S309). The extension unit 14a stores the acquired replacement character string in the extension region 13c (Step S310), and the process proceeds to Step S313.

If the value of the replacement flag is not "1" (No at Step S307), the extension unit 14a performs processing as follows. That is, the extension unit 14a refers to the dictionary 13b and acquires data combining the character codes of respective character strings from the root of the trie to the specified leaf of the trie in the order of the character strings, as extended data (Step S311). The extension unit 14a stores the acquired extended data in the extension region 13c (Step S312). The extension unit 14a updates the dictionary 13b (Step S313).

The extension unit 14a selects an unselected retrieval character string from among the retrieval character strings (Step S314). The extension unit 14a specifies a character string that is newly added to the dictionary 13b (Step S315). The extension unit 14a determines whether the character string that is newly added to the dictionary 13b matches the retrieval character string (Step S316).

If they match (Yes at Step S316), the storing unit 14b sets "1" to the item of the collation flag, "1" to the item of the replacement flag, and a pointer to the item of the pointer to the replacement table, in the leaf structure of the trie specified by the extension unit 14a (Step S317). Then the process proceeds to Step S318. If they don't match (No at Step S316), the extension unit 14a determines whether there is an unselected retrieval character string in the retrieval character strings (Step S318). If there is an unselected retrieval character string (Yes at Step S318), the process returns to Step S314. If there is no unselected retrieval character string (No at Step S318), the extension unit 14a determines whether there is unprocessed compressed data in the file to be extended (Step S319). If there is unprocessed compressed data in the file to be extended (Yes at Step S319), the process returns to Step S303. If there is no unprocessed compressed data in the file to be extended (No at Step S319), the extension unit 14a determines whether there is an unselected file in the compressed digital content files (Step S320). If there is an unselected file (Yes at Step S320), the process returns to Step S302. If there is no unselected file (No at Step S320), the processing result is stored in the internal memory of the control unit 14 and the process is returned.

As described above, the user terminal 3 according to the present embodiment extends the compressed character string using the dictionary 13b represented by the leaf of the trie. The user terminal 3 according to the present embodiment updates the dictionary 13b by adding to the trie a new leaf in which a combination of the compression code sequence and the character string, which includes a newly extended character string and is not registered in the dictionary 13b, is registered, corresponding to the content registered in the dictionary 13b and the extended character string. If the character string registered in the new leaf of the trie matches the retrieval character string, the user terminal 3 according to the present embodiment sets a piece of information for identifying a leaf in which the compression code sequence corresponding to the retrieval character string is registered, for example "1", to the collation flag and the replacement flag. The user terminal 3 according to the present embodiment refers to the collation flag and the replacement flag, and retrieves whether there is the compression code sequence corresponding to the retrieval character string in the compressed data to be extended. If there is the compression code sequence corresponding to the retrieval character string in the compressed data to be extended, the user terminal 3 according to the present embodiment determines that the retrieval is successful. Accordingly, the user terminal 3 according to the present embodiment can retrieve the retrieval character string without extending the compressed data to be extended, so that retrieval speed can be accelerated. That is, it is possible to reduce the processing time of retrieval processing on the compressed data.

Even though the content registered in the dictionary 13b is in the initialization state before extension is started, the user terminal 3 according to the present embodiment can register information for identifying the leaf in which the compression code sequence corresponding to the retrieval character string is registered, while growing the dictionary 13b.

If the value of the collation flag is "1" in the leaf of the trie in which the compression code sequence to be extended is stored, the user terminal 3 according to the present embodiment determines that the retrieval character string is retrieved, and updates the frequency data 13d indicating the number of retrieval character strings included in the file. Accordingly, with the user terminal 3 according to the present embodiment, the speed of the retrieval processing is accelerated as compared to a case of extending the file of the compressed digital content and scanning the extended file data for each predetermined number of characters to retrieve the retrieval character string.

Herein, it is assumed that the digital content serving as a processing target of the user terminal 3 is digital content in the EPUB format. In some cases, the digital content in the EPUB format may be compressed in the ZIP format in advance. To accelerate the retrieval processing of the retrieval character string in such digital content that is compressed in advance, it is considered to generate an appearance map as described in International Publication Pamphlet No. WO 2006/123448 to be used in compression. The speed of the retrieval processing is accelerated with the user terminal 3 according to the present embodiment, so that the frequency data 13d used in generating the appearance map is also generated at high speed. Accordingly, with the user terminal 3, it is possible to reduce time used for generating the appearance map from the digital content that is compressed in advance. Then the user terminal 3 generates the appearance map using the frequency data 13d, narrows down the digital content files including the retrieval character string using the generated appearance map, and performs full-text retrieval of the retrieval character string, so that the retrieval processing can be further accelerated.

When the character string to be obtained by extending the compressed data to be extended is the retrieval character string, the user terminal 3 according to the present embodiment omits the processing of extending the compressed data and replaces the compressed data with the replacement character string, so that the speed of the retrieval processing is accelerated.

Second Embodiment

In the first embodiment described above, a case in which LZ78 is adopted as a compression scheme is exemplified. However, the device disclosed herein is not limited thereto. A second embodiment will describe a case in which LZ77 is adopted as the compression scheme.

Configuration Example of System 21

Figure 13:
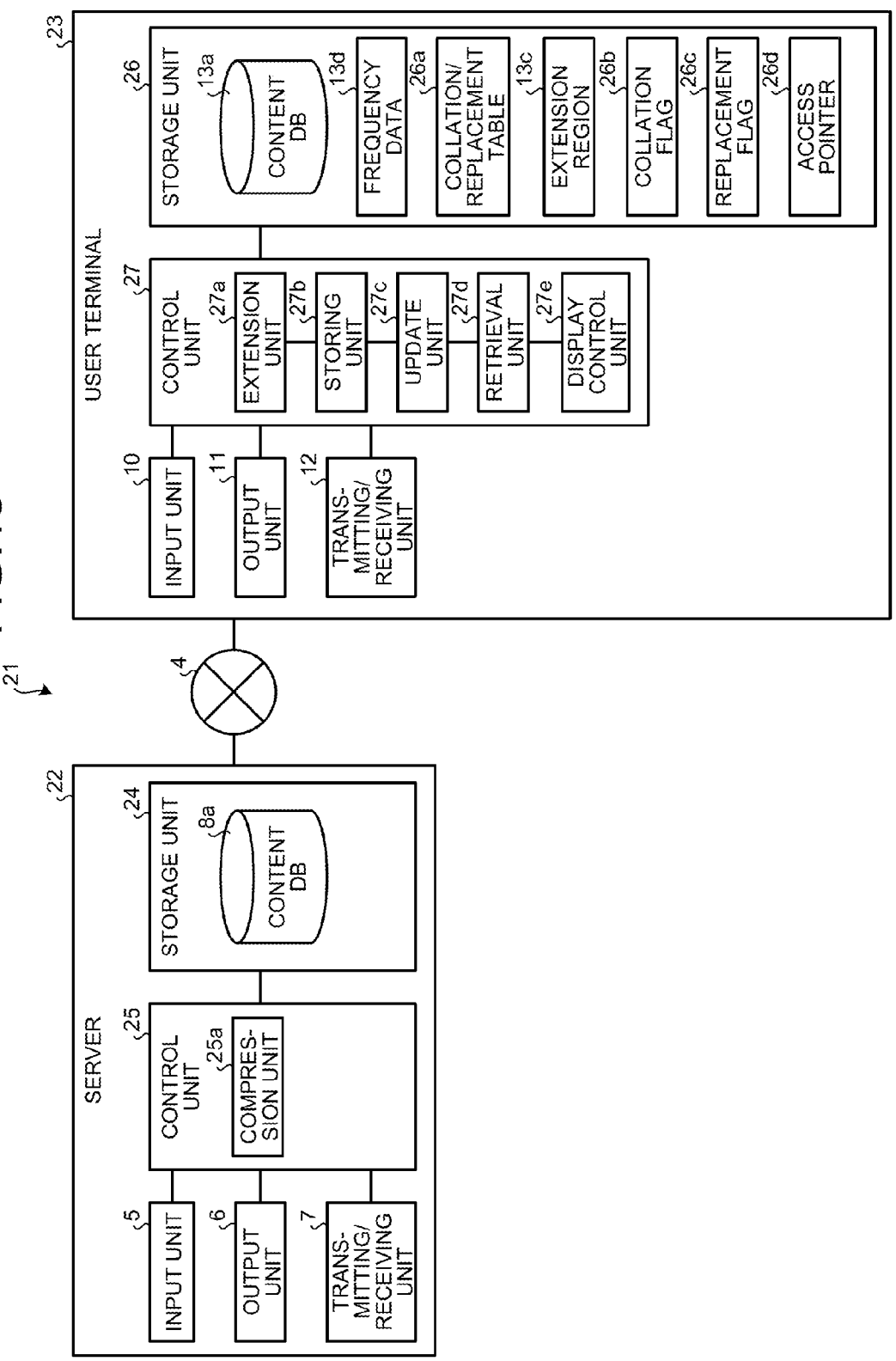
FIG. 13 is a diagram illustrating a configuration example of a system according to a second embodiment.

The following describes a system according to the second embodiment. FIG. 13 is a diagram illustrating a configuration example of the system according to the second embodiment. The system 21 according to the present embodiment includes a server 22 and a user terminal 23. The server 22 is different from that of the first embodiment in that it includes a storage unit 24 and a control unit 25 instead of the storage unit 8 and the control unit 9 according to the first embodiment. The user terminal 23 is different from that of the first embodiment in that it includes a storage unit 26 and a control unit 27 instead of the storage unit 13 and the control unit 14 according to the first embodiment. Hereinafter, components and devices having the same function as those in the first embodiment are denoted by the same reference numerals as in FIG. 1, and description thereof may be omitted. The server 22 compresses each piece of file data of a plurality of pieces of digital content. The server 22 transmits encrypted file data of the pieces of digital content to the user terminal 23 via the Internet 4. The user terminal 23 retrieves the retrieval character string included in each file while extending file data of a plurality of received electronic books, counts the appearance frequency and the number of appearance files of the retrieval character string, and displays an item including the retrieval character string of each file.

The server 22 includes the input unit 5, the output unit 6, the transmitting/receiving unit 7, the storage unit 24, and the control unit 25.

The input unit 5 receives the digital content from the user, and inputs the received digital content to the control unit 25. The input unit 5 also receives an instruction for performing compression processing described later from the user, and inputs the received instruction to the control unit 25. The output unit 6 outputs an operating state of the server 22. The transmitting/receiving unit 7 is a communication interface for communication between the server 22 and the user terminal 23. For example, when receiving a transmission request of a digital content file registered in the content data DB from the user terminal 23 via the Internet 4, the transmitting/receiving unit 7 transmits the received transmission request to the control unit 25. When receiving the digital content file registered in the content DB 8a described later from the control unit 25, the transmitting/receiving unit 7 transmits the received digital content file to the user terminal 23 via the Internet 4.

The storage unit 24 stores therein various pieces of information. The storage unit 24, for example, stores therein the content DB 8a. A file of the compressed digital content is registered in the content DB 8a. For example, the digital content file compressed by a compression unit 25a described later is registered in the content DB 8a. The digital content file registered in the content DB 8a is transmitted to the user terminal 23 corresponding to the instruction from the user terminal 23.

For example, the storage unit 24 is a semiconductor memory device such as a flash memory, or a storage device such as a hard disk and an optical disc. The storage unit 24 is not limited to the above-described type of storage device, and may be a random access memory (RAM) or a read only memory (ROM).

The control unit 25 includes an internal memory for storing therein control data or a computer program that defines various processing procedures to perform various types of processing. As illustrated in FIG. 13, the control unit 25 includes the compression unit 25a.

The compression unit 25a compresses a file of the digital content input from the input unit 5. The compression unit 25a, for example, compresses each of the digital content files using a slide window that includes a reference part and an encoding part based on the LZ77 compression scheme. The compression unit 25a registers each of the compressed files in the content DB 8a for each piece of the digital content.

The user terminal 23 includes the input unit 10, the output unit 11, the transmitting/receiving unit 12, the storage unit 26, and the control unit 27.

The input unit 10 inputs various pieces of information to the control unit 27. The input unit 10, for example, receives the retrieval character string and the instruction for performing extension/retrieval processing described later from the user, and inputs the received retrieval character string and the instruction to the control unit 27.

The output unit 11 displays an item including the replacement character string, and the number of appearances and the number of appearance files of each character represented by the frequency data 13d using a display control unit 27e described later.

The transmitting/receiving unit 12 is a communication interface for communication between the user terminal 23 and the server 22. For example, when receiving a transmission request of a digital content file registered in the content DB from the control unit 27, the transmitting/receiving unit 12 transmits the received transmission request to the server 22 via the Internet 4. When receiving the digital content file registered in the content DB 8a from the server 22, the transmitting/receiving unit 12 transmits the received file to the control unit 27.

The storage unit 26 stores therein various pieces of information. The storage unit 26, for example, stores therein the content DB 13a, the extension region 13c, the frequency data 13d, a collation/replacement table 26a, a collation flag 26b, a replacement flag 26c, and an access pointer 26d.

Each file of the digital content extended by an extension unit 27a described later is registered in the content DB 13a.

The extension region 13c is a storage region in which data extended by the extension unit 27a described later is stored. The storage region represented by the extension region 13c of the storage unit 26 is also referred to as an extension buffer.

Figure 14:
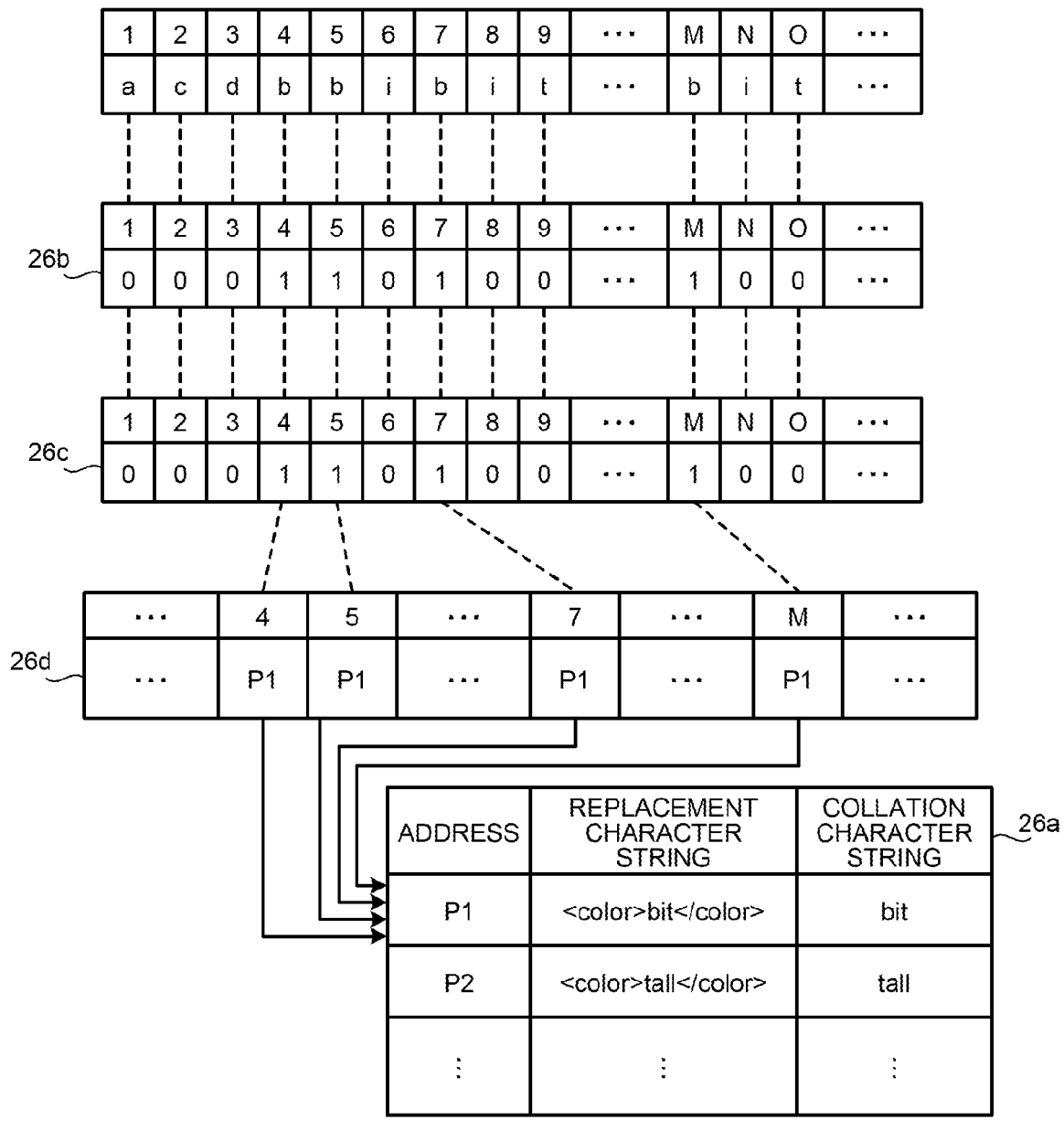
FIG. 14 is a diagram illustrating an example of data used in the processing performed by the user terminal.

A storing unit 27b described later registers, in the collation/replacement table 26a, a collation character string to be used for collation and a replacement character string obtained by converting the retrieval character string to a predetermined character string. FIG. 14 is a diagram illustrating an example of data used in the processing performed by the user terminal. FIG. 14 illustrates a case in which the collation character string "bit" and a replacement character string, which is the retrieval character string "bit" to which tags "<color>" and "</color>" are given, are registered in the collation/replacement table 26a.

The collation flag 26b is a flag associated with each character of the extended character string. That is, a flag for each extended character is provided in the collation flag 26b. According to the example of FIG. 14, in the collation flag 26b, the flag is provided for each character of the extended character string "acdbbibit . . . bit . . . " in the digital content file. In this way, the collation flag 26b is associated with each character of the character string obtained when each digital content file is extended, so that the size of the collation flag 26b is increased with the extension of the digital content file. When each flag in the collation flag 26b is in an ON state, the flag indicates a collation command to collate the retrieval character string with a character string starting from a corresponding character of the reference part and corresponding to the number of characters of the retrieval character string. In a case in which the first character of the retrieval character string matches the character in the reference part when the slide window moves, the storing unit 27b described later registers a value indicating that the flag is ON, for example "1", in each flag in the collation flag 26b. In the initial state, a value indicating that the flag is OFF, for example "0", is registered in each flag in the collation flag 26b.

The replacement flag 26c is a flag associated with each character of the extended character string. That is, a flag for each extended character is provided in the replacement flag 26c. According to the example of FIG. 14, in the replacement flag 26c, the flag is provided for each character of the extended character string "acdbbibit . . . bit . . . " in the digital content file. In this way, the replacement flag 26c is associated with each character of the character string obtained when each digital content file is extended, so that the size of the replacement flag 26c is increased with the extension of the digital content file. When each flag in the replacement flag 26c is in the ON state, the flag indicates a replacement command to replace a pointer serving as compressed data to be extended with the replacement character string if the collation result indicates that the retrieval character string matches the character string in the reference part corresponding to the number of characters of the retrieval character string. In a case in which the first character of the retrieval character string matches the character in the reference part when the slide window moves, the storing unit 27b described later registers a value indicating that the flag is ON, for example "1", in each flag in the replacement flag 26c. In the initial state, the value indicating that the flag is OFF, for example "0", is registered in each flag in the replacement flag 26c.

The storing unit 27b registers, in the access pointer 26d, the pointer that points to the replacement character string registered in the collation/replacement table 26a, in a case in which the first character of the retrieval character string matches the character in the reference part when the slide window moves. The access pointer 26d includes a region associated with each character of the extended character string. That is, the pointer can be registered in the access pointer 26d for each extended character. In the example of FIG. 14, a region to which the pointer is registered is provided in the access pointer 26d for each character of the extended character string "acdbbibit . . . bit . . . " in the digital content file. In this way, each region of the access pointer 26d is associated with each character of the character string obtained when each digital content file is extended, so that the size of the access pointer 26d is increased with the extension of the digital content file.

For example, the storage unit 26 is a semiconductor memory device such as a flash memory, or a storage device such as a hard disk and an optical disc. The storage unit 26 is not limited to the above-described type of storage device, and may be a random access memory (RAM) or a read only memory (ROM).

The control unit 27 includes an internal memory for storing therein control data or a computer program that defines various processing procedures to perform various types of processing. As illustrated in FIG. 13, the control unit 27 includes an extension unit 27a, a storing unit 27b, an update unit 27c, a retrieval unit 27d, and the display control unit 27e.

The extension unit 27a extends the digital content file using the slide window based on the LZ77 compression scheme. The extension unit 27a, for example, acquires a character string indicated by the pointer in the encoding part of the slide window from among the extended character strings in the reference part of the slide window. Then the extension unit 27a extends the pointer positioned at the encoding part by replacing the pointer with the acquired character string. The extension unit 27a causes the extended character string to move across the file data of the digital content so that the extended character string is included in the reference part. That is, the extension unit 27a extends the compressed character string using the extended character string.

The following describes a specific example. The extension unit 27a acquires a plurality of pieces of digital content transmitted from the server 22. The extension unit 27a selects an unselected file as a file to be extended from among the acquired digital content files. The extension unit 27a sets the file to be extended to the encoding part of the slide window. Subsequently, the extension unit 27a extends an unprocessed compressed data positioned at the encoding part of the slide window with reference to the data in the reference part as a dictionary.

The data present in the encoding part includes raw data that is the uncompressed data and the pointer that is the compressed data. To discriminate the row data and the pointer, "0" is added to a head of the raw data, and "1" is added to a head of the pointer. For example, when the character "A" is present in the encoding part as the raw data, the data present in the encoding part is represented as "<0,0x41>". The pointer is represented as "<1,m,l>". Herein, "m" indicates a position from a head of the slide window of a longest match sequence. "l" indicates a length of the longest match sequence. That is, the pointer indicates a character string from the m-th character to the l-th character in the reference part.

A piece of data of which first value is "0" among the pieces of data in the encoding part is the raw data, so that the extension unit 27a acquires a piece of data subsequent to "0" as the extended data as it is. A piece of data of which first value is "1" among the pieces of data in the encoding part is the pointer, so that the extension unit 27a acquires character string data of the reference part indicated by the pointer as the extended data. The extension unit 27a stores the extended data in the extension region 13c.

The extension unit 27a moves the position of the slide window on the file data to be extended by the number of characters of the character string on which the extension processing is performed. Then the extension unit 27a calculates a total movement amount of the slide window in the file to be extended. For example, although the total movement amount of the slide window is "0" before the extension processing is performed, the total movement amount is "q" when the movement amount of the slide window is "q" in the first extension. In addition, when the movement amount is "u" in the second extension, the total movement amount is "q+u".

Figure 15:
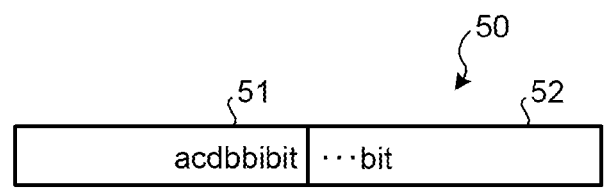
FIG. 15 is a diagram for explaining the processing performed by the user terminal.

The extension unit 27a determines whether there is a character that matches the first character of the retrieval character string in the character string positioned at the reference part after movement of the slide window, in a case in which the slide window is moved. FIG. 15 is a diagram for explaining the processing performed by the user terminal. In the example of FIG. 15, a character string of "acdbbitit" is included in a reference part 51 of a slide window 50, which includes the reference part 51 and an encoding part 52. In the example of FIG. 15, when the retrieval character string is "bit", the extension unit 27a determines whether there is a character "b" in the character string of the reference part 51 to determine that "there is a matching character "b"". Practically, there is the raw data and the pointer in the encoding part 52. However, in the example of FIG. 15, a character string " . . . bit" to be obtained by extending the pointer and the like, is schematically illustrated in the encoding part 52.

If it is determined that there is a character that matches the first character of the retrieval character string in the character string positioned at the reference part after the movement, the extension unit 27a specifies the position, from the head of the slide window, of the character of the reference part 51 that is determined to be matched. For example, in a case in which the retrieval character string is "bit", there is the character "b" in the character string of the reference part 51, and the position of the character "b" from the head of the slide window is "126", the extension unit 27a specifies "126" as the position of the character "b".

The extension unit 27a specifies a position of a flag in the collation flag 26b, a position of a flag in the replacement flag 26c, and a position of a region in which the pointer of the access pointer 26d is stored, corresponding to the character of the reference part that is determined to be matched. Hereinafter, "a position of a region or a flag corresponding to the character of the reference part that is determined to be matched" is referred to as a "storing position". The extension unit 27a can specify the storing position according to a following equation (1).

Storing position="a position of the character of the reference part that is determined to be matched, from the head of the slide window"−("a length of the reference part of the slide window"−"total sliding amount")     equation (1)

For example, the example of FIG. 14 illustrates a case in which the extension unit 27a specifies "3", "4", "6", and "M" as a storing position for each character "b" in the reference part that is determined to be matched with the first character "b" of the retrieval character string "bit". The storing position specified as described above will be used by the storing unit 27b described later in setting "1" to the flag in the collation flag 26b and the flag in the replacement flag 26c, and in setting the pointer to the region of the access pointer 26d.

If the retrieval unit 27d described later determines that a value of the flag in the replacement flag 26c indicated by the specified storing position is "1", the extension unit 27a performs processing as follows. That is, the extension unit 27a does not extend the pointer of the encoding part, acquires a pointer of the access pointer 26d, acquires a replacement character string indicated by the acquired pointer from the collation/replacement table 26a, and stores the acquired replacement character string in the extension region 13c.

In a case in which, when the position of the slide window is moved, there is a character that matches the first character of the retrieval character string in the character string positioned at the reference part after the movement, the storing unit 27b sets "1" to a flag in the collation flag 26b corresponding to the character in the reference part that matches the first character. For example, in the examples of FIG. 14 and FIG. 15, if the extension unit 27a determines that there is the first character "b" of the retrieval character string "bit" in the reference part, the storing unit 27b performs processing as follows. That is, the storing unit 27b sets "1" to the flag in the collation flag 26b indicated by the storing position that is specified for each character "b" in the reference part.

In a case in which, when the position of the slide window is moved, there is a character that matches the first character of the retrieval character string in the character string positioned at the reference part after the movement, the storing unit 27b sets "1" to a flag in the replacement flag 26c corresponding to the character in the reference part that matches the first character. For example, in the examples of FIG. 14 and FIG. 15, if the extension unit 27a determines that there is the first character "b" of the retrieval character string "bit" in the reference part, the storing unit 27b performs processing as follows. That is, the storing unit 27b sets "1" to the flag in the replacement flag 26c indicated by the storing position that is specified for each character "b" in the reference part.

In a case in which, when the position of the slide window is moved, there is a character that matches the first character of the retrieval character string in the character string positioned at the reference part after the movement, the storing unit 27b sets a pointer to a region of the access pointer 26d corresponding to the character in the reference part that matches the first character. For example, in the examples of FIG. 14 and FIG. 15, if the extension unit 27a determines that there is the first character "b" of the retrieval character string "bit" in the reference part, the storing unit 27b performs processing as follows. That is, the storing unit 27b registers, in the region of the access pointer 26d indicated by the storing position specified for each character "b" in the reference part, a pointer "P1" that points to the retrieval character string "bit" in the collation/replacement table 26a.

The update unit 27c updates the frequency data 13d. For example, if it is determined that the character string acquired from the reference part matches the collation character string as a result of collation by the retrieval unit 27d described later, the update unit 27c performs processing as follows because the character string to be obtained by extending the unprocessed compressed data is the retrieval character string. That is, the update unit 27c increments, by one, a value of the number of appearances of the retrieval character string in the frequency data 13d, and increments, by one, a value of the number of appearance files of the retrieval character string in the file to be extended.

The retrieval unit 27d determines whether, when the slide window is moved, there is a character in which "1" is set to the flag of the collation flag 26b in the character string in the reference part indicated by the pointer to be extended in the encoding part. First, the retrieval unit 27d, for example, specifies the storing position of each character of the character string in the reference part indicated by the pointer to be extended in the encoding part, using the equation (1). Then the retrieval unit 27d determines whether a value of the flag in the collation flag 26b indicated by the specified storing position is "1".

If there is a character in which "1" is set to the flag in the collation flag 26a in the character string in the reference part indicated by the pointer to be extended in the encoding part, the retrieval unit 27d acquires a character string for collation indicated by the pointer of the access pointer 26d from the collation/replacement table 26a. The retrieval unit 27d acquires a character string corresponding to the number of characters of the retrieval character string starting from the character of the reference part in which "1" is set to the flag of the collation flag 26a. Then the retrieval unit 27d collates the acquired character string with the acquired character string for collation. That is, the retrieval unit 27d retrieves the retrieval character string for each point where the character in which "1" is set to the flag of the collation flag 26a appears, from the character strings to be obtained by extending the compressed data.

The retrieval unit 27d determines whether, when the slide window is moved, there is a character in which "1" is set to the flag in the replacement flag 26c in the character string in the reference part indicated by the pointer to be extended in the encoding part. First, the retrieval unit 27d, for example, specifies the storing position of each character of the character string in the reference part indicated by the pointer to be extended in the encoding part, using the equation (1). Then the retrieval unit 27d determines whether a value of the flag of the replacement flag 26c indicated by the specified storing position is "1".

The display control unit 27e causes the display device of the output unit 11 to display an item including the replacement character string stored in the extension region 13c. The display control unit 27e also causes the display device of the output unit 11 to display the number of appearances and the number of appearance files of each character represented by the frequency data 13d.

The control unit 27 includes an integrated circuit such as an application specific integrated circuit (ASIC) and a field programmable gate array (FPGA). The control unit 27 may include an electronic circuit such as a central processing unit (CPU) and a micro processing unit (MPU).

Processing Flow

Figure 16:
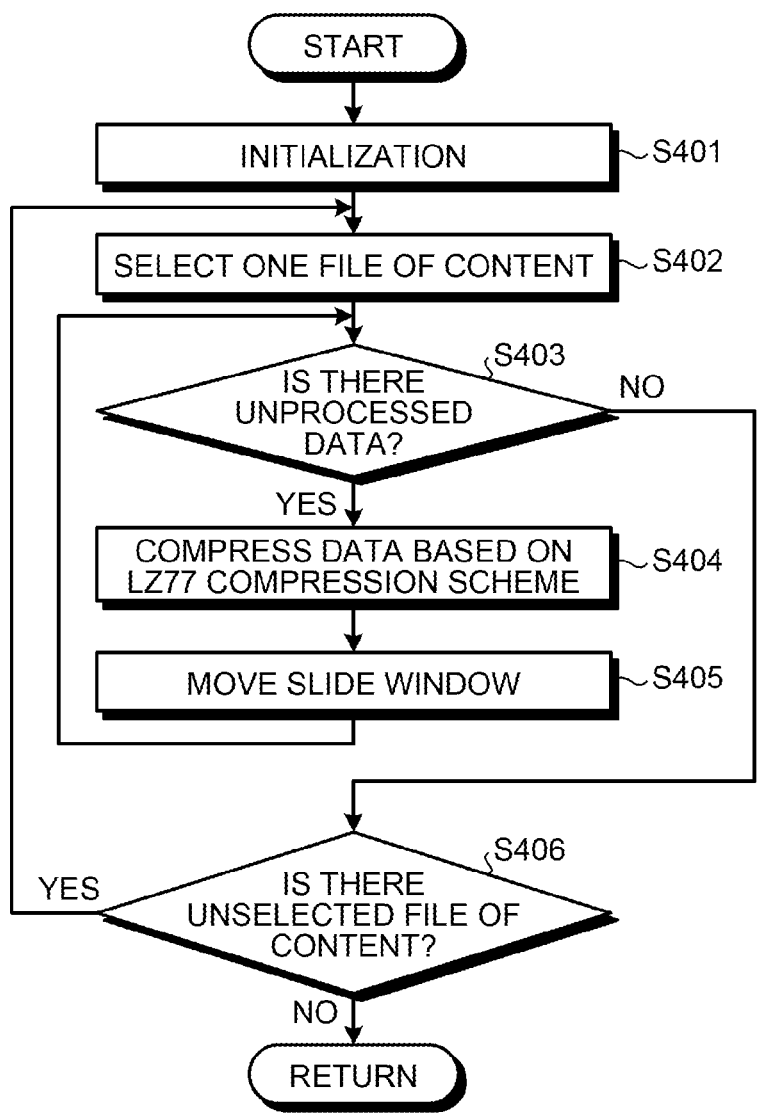
FIG. 16 is a flowchart illustrating a procedure of compression processing according to the second embodiment.

Next, the following describes a processing flow of the server 22 according to the present embodiment. FIG. 16 is a flowchart illustrating a procedure of compression processing according to the second embodiment. The compression processing may be performed at various timings. For example, the compression processing may be performed when the digital content is input from the input unit 5. A processing flow of system 1 according to the present embodiment is similar to the processing flow illustrated in the sequence diagram of the system according to the first embodiment, so that description thereof is not repeated here.

As illustrated in FIG. 16, the compression unit 25a initializes the slide window and sets the digital content file to the slide window (Step S401). The compression unit 25a selects one of the digital content files input from the input unit 5 (Step S402). The compression unit 25a determines whether there is data that is not compressed in the selected file data of the digital content (Step S403). If there is the data that is not compressed (Yes at Step S403), the compression unit 25a uses the slide window to compress the data based on the LZ77 compression scheme (Step S404). The compression unit 25a moves the slide window (Step S405), and the process returns to Step S403.

If there is no data that is not compressed (No at Step S403), the compression unit 25a determines whether there is a file that is not selected at Step S402 (Step S406). If there is the unselected file (Yes at Step S406), the process returns to Step S402, and the compression unit 25a selects the unselected file to perform subsequent processing again. If there is no unselected file (No at Step S406), a processing result is stored in the internal memory of the control unit 25 and the process is returned.

Figure 17:
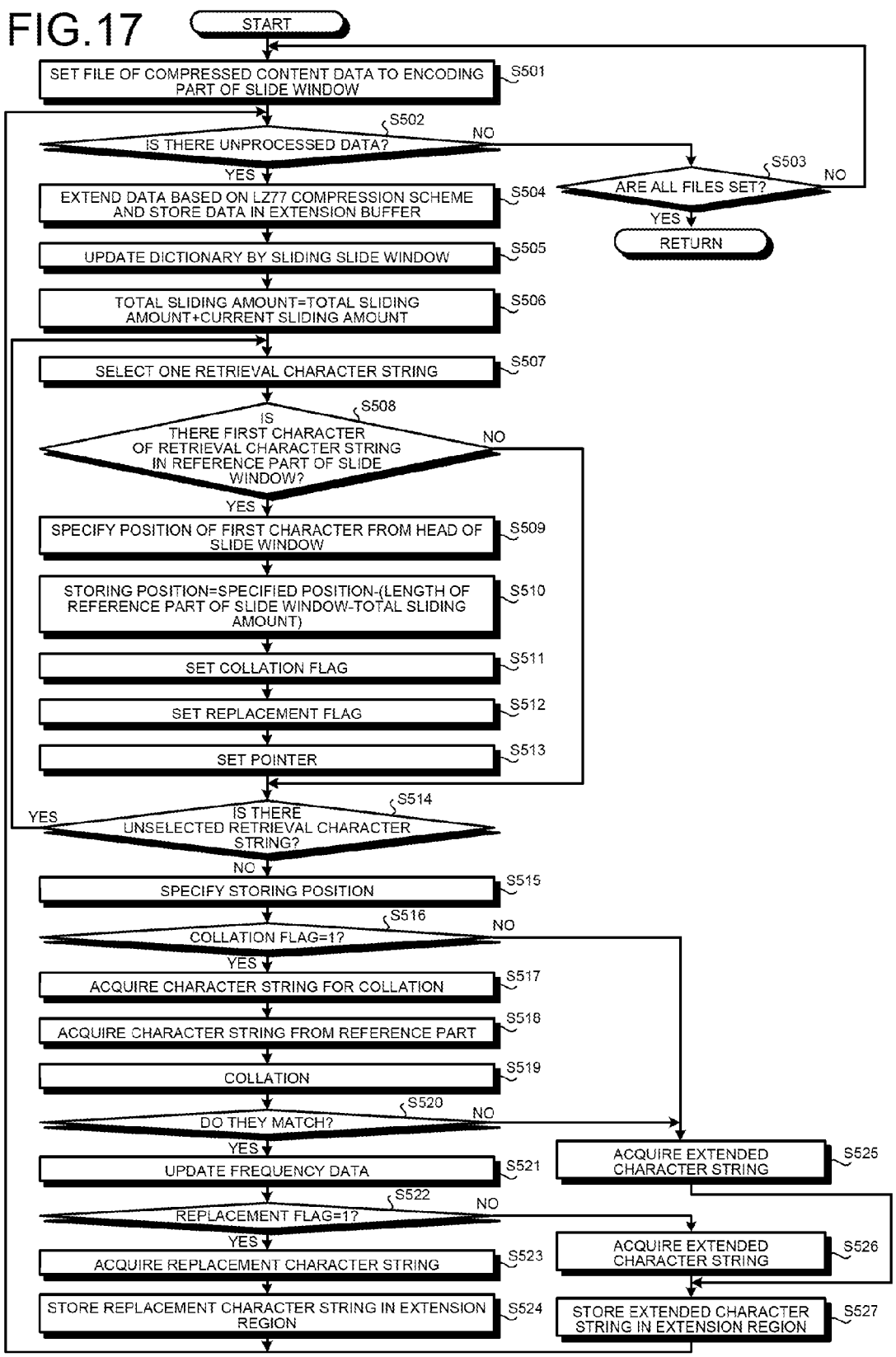
FIG. 17 is a flowchart illustrating a procedure of extension/retrieval processing according to the second embodiment.

Next, the following describes a processing flow of the user terminal 23 according to the present embodiment. FIG. 17 is a flowchart illustrating a procedure of extension/retrieval processing according to the second embodiment.

As illustrated in FIG. 17, the extension unit 27a initializes the slide window, selects a compressed file of the digital content that is not selected as a processing target file, and sets the processing target file to the slide window (Step S501). The extension unit 27a determines whether there is data that is not extended in the data of the processing target file (Step S502). If there is no data that is not extended (No at Step S502), the extension unit 27a determines whether all of the digital content files are selected as the processing target files (Step S503). If all of the digital content files are not selected (No at Step S503), the process returns to Step S501. If all of the digital content files are selected (Yes at Step S503), the processing result is stored in the internal memory of the control unit 27 and the process is returned.

If there is unprocessed data (Yes at Step S502), the extension unit 27a extends the unprocessed compressed data in the encoding part of the slide window with reference to the data in the reference part as a dictionary, and stores the data in the extension region 13c (Step S504). The extension unit 27a updates the dictionary indicated by the character string in the reference part of the slide window by sliding the slide window (Step S505). The extension unit 27a calculates the total movement amount of the slide window in the file to be extended (Step S506). The extension unit 27a selects an unselected retrieval character string from among the retrieval character strings (Step S507). The extension unit 27a determines whether there is a character that matches the first character of the retrieval character string in the character string positioned at the reference part (Step S508).

If there is a matching character (Yes at Step S508), the extension unit 27a specifies the position, from the head of the slide window, of the character that matches the first character of the retrieval character string in the reference part (Step S509). The extension unit 27a specifies a storing position (Step S510). The storing unit 27b sets "1" to a flag in the collation flag 26b corresponding to the character in the reference part that matches the first character of the retrieval character string (Step S511). The storing unit 27b sets "1" to a flag in the replacement flag 26c corresponding to the character in the reference part that matches the first character of the retrieval character string (Step S512). The storing unit 27b sets a pointer that points to the replacement character string for replacing the retrieval character string to a region of the access pointer 26d corresponding to the character in the reference part that matches the first character of the retrieval character string (Step S513). The extension unit 27a determines whether there is a retrieval character string that is not selected at Step S507 (Step S514). If there is an unselected retrieval character string (Yes at Step S514), the process returns to Step S507.

If there is no unselected retrieval character string (No at Step S514), the retrieval unit 27d performs processing as follows. The retrieval unit 27d determines whether there is a character in which "1" is set to the flag in the collation flag 26a in the character string in the reference part indicated by the pointer to be extended in the encoding part (Step S516). If the character is not present (No at Step S516), the process proceeds to Step S525 described later. If the character is present (Yes at Step S516), the retrieval unit 27d acquires a character string for collation indicated by the pointer of the access pointer 26d from the collation/replacement table 26a (Step S517).

The retrieval unit 27d acquires a character string corresponding to the number of characters of the retrieval character string starting from the character of the reference part in which "1" is set to the flag in the collation flag 26a (Step S518). The retrieval unit 27d collates the acquired character string with the acquired character string for collation (Step S519). If they match with each other as a result of collation (Yes at Step S520), the update unit 27c updates the frequency data 13d (Step S521). The retrieval unit 27d determines whether there is a character in which "1" is set to the flag in the replacement flag 26c in the character string in the reference part indicated by the pointer to be extended in the encoding part (Step S522). If they do not match with each other as a result of collation (No at Step S520), the extension unit 27a acquires extended data (Step S525), and the process proceeds to Step S527.

If there is a character in which "1" is set to the flag in the replacement flag 26c in the character string in the reference part indicated by the pointer to be extended in the encoding part (Yes at Step S522), the extension unit 27a performs processing as follows. That is, the extension unit 27a acquires a pointer from the access pointer 26d and acquires a replacement character string indicated by the acquired pointer from the collation/replacement table 26a (Step S523). The extension unit 27a stores the acquired replacement character string in the extension region 13c (Step S524), and the process returns to Step S502.

If there is no character in which "1" is set to the flag in the replacement flag 26c in the character string in the reference part indicated by the pointer to be extended in the encoding part (No at Step S522), the extension unit 27a performs processing as follows. The extension unit 27a acquires the extended data (Step S526). The extension unit 27a stores the extended data in the extension region 13c (Step S527), and the process returns to Step S502.

As described above, the user terminal 23 according to the present embodiment extends the compressed character string using the extended character string. If the extended character matches part of the retrieval character string, the user terminal 23 according to the present embodiment sets "1" to the collation flag and the replacement flag corresponding to the matching character. The user terminal 23 according to the present embodiment retrieves whether there is the retrieval character string in the character string to be obtained by extending the compressed character string, for each point where the character in which "1" is set to the collation flag and the replacement flag appears. In this way, the user terminal 23 according to the present embodiment retrieves whether there is the retrieval character string in the character string to be obtained by extending the compressed data to be extended, for each point where the character in which "1" is set to the collation flag and the replacement flag appears. If there is the retrieval character string, the user terminal 23 according to the present embodiment determines that the retrieval is successful. Accordingly, the user terminal 23 according to the present embodiment can retrieve the retrieval character string without extending the compressed data to be extended, so that retrieval speed can be accelerated. That is, it is possible to reduce the processing time of retrieval processing on the compressed data.

Even though the content registered in the dictionary indicated by the slide window is empty before extension is started, the user terminal 23 according to the present embodiment can register information relating to the character that matches part of the retrieval character string, while growing the dictionary indicated by the slide window.

The user terminal 23 according to the present embodiment retrieves whether there is the retrieval character string in the character string to be obtained by extending the compressed data to be extended, for each point where the character in which "1" is set to the collation flag and the replacement flag appears. Accordingly, the user terminal 23 according to the present embodiment does not retrieve the retrieval character string from all of the extended characters, so that the speed of the retrieval processing is accelerated as compared to a case of extending the file of the compressed digital content and scanning the extended file data for each predetermined number of characters to retrieve the retrieval character string from all pieces of the data.

Herein, it is assumed that the digital content serving as a processing target of the user terminal 23 is digital content in the EPUB format. In some cases, the digital content in the EPUB format may be compressed in the ZIP format in advance. To accelerate the retrieval processing of the retrieval character string in such digital content that is compressed in advance, it is considered to generate an appearance map as described in International Publication Pamphlet No. WO 2006/123448 to be used in compression. The speed of the retrieval processing is accelerated with the user terminal 23 according to the present embodiment, so that the frequency data 13d used in generating the appearance map is also generated at high speed. Accordingly, with the user terminal 23, it is possible to reduce time for generating the appearance map from the digital content that is compressed in advance. Then the user terminal 23 generates the appearance map using the frequency data 13d, narrows down the digital content files including the retrieval character string using the generated appearance map, and performs full-text retrieval of the retrieval character string, so that the retrieval processing can be further accelerated.

Regarding a point where there is the retrieval character string, the user terminal 23 according to the present embodiment omits the processing of extending the compressed data and replaces the compressed data with the replacement character string, so that the speed of the retrieval processing is accelerated.

The embodiments of the device according to the present disclosure have been described hereinabove. Alternatively, the present invention may also be made in various different modes other than the embodiments described above. The following describes other embodiments included in the present invention.

For example, the first embodiment illustrates the case in which the dictionary 13b represented by the trie is expanded by extension processing even after specifying the leaf in which the compression code sequence corresponding to the retrieval character string is registered. However, the device disclosed herein is not limited thereto. For example, after specifying the leaf in which the compression code sequence corresponding to the retrieval character string is registered, the device disclosed herein retrieves whether there is the compression code sequence registered in the specified leaf from the compressed data that is not extended without extension processing, so that the retrieval processing can be further accelerated.

All or part of the processing described to be automatically performed in the first embodiment may be manually performed. All or part of the processing described to be manually performed in the first embodiment may be automatically performed using a known method. For example, a person may select the retrieval character string at Step S314 and Step S507.

The process at each step in each piece of processing in each embodiment may be arbitrarily divided or combined depending on various loads or usage states. The steps may be omitted. The processes at Step S511 to Step S513 may be combined.

The order of the process at each step in each piece of processing described in each embodiment may be changed depending on various loads or usage states.

The components of the devices illustrated in the drawings are merely conceptual, and it is not necessarily needed that it is physically configured as illustrated necessarily. That is, specific forms of distribution and integration of the devices are not limited to those illustrated in the drawings. All or part thereof may be functionally or physically distributed/integrated in arbitrary units depending on various loads or usage states. For example, the update unit 14c may be integrated with the retrieval unit 14d. The update unit 27c may be integrated with the retrieval unit 27d.

Third Embodiment

Retrieval Program

Figure 18:
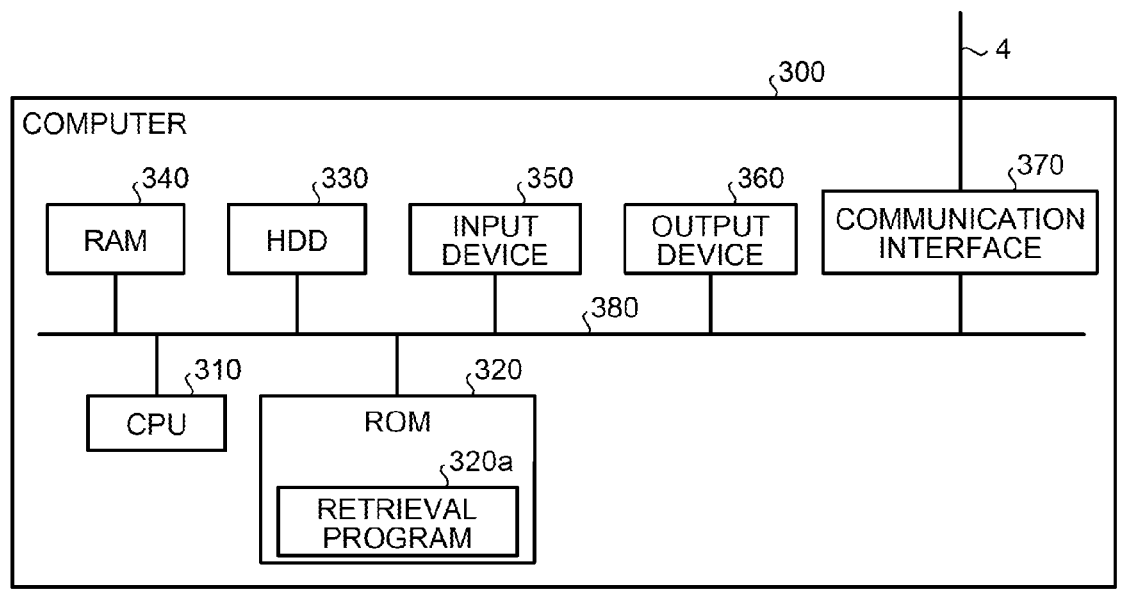
FIG. 18 is a diagram illustrating a computer that executes a retrieval program.

The processing of the user terminal described in the first and second embodiments may also be implemented by executing a computer program prepared in advance by using a computer system such as a personal computer or a workstation. The following describes an example of a computer that executes a retrieval program having the same function as that of the user terminal described in the above embodiments with reference to FIG. 18. FIG. 18 is a diagram illustrating the computer that executes the retrieval program.

As illustrated in FIG. 18, a computer 300 includes a central processing unit (CPU) 310, a read only memory (ROM) 320, a hard disk drive (HDD) 330, and a random access memory (RAM) 340. The computer 300 also includes an input device 350, an output device 360, and a communication interface 370 connected to the Internet 4. These components 310 to 370 are connected to each other via a bus 380.

The input device 350 includes various input devices, for example, a keyboard or a mouse. The input device 350 corresponds to the input unit 5 included in the server of each of the embodiments.

The output device 360 includes various output devices, for example, a liquid crystal display device. The output device 360 corresponds to the output unit 6 included in the server of each of the embodiments.

The communication interface 370 corresponds to the transmitting/receiving unit 7 included in the server of each of the embodiments.

A retrieval program 320a is stored in the ROM 320 in advance, the retrieval program 320a exhibiting the same function as those of the extension unit, the storing unit, and the retrieval unit illustrated in the above embodiments. The retrieval program 320a may be appropriately separated.

Then the CPU 310 reads out the retrieval program 320a from the ROM 320 and executes the retrieval program 320a.

The HDD 330 is provided with a content DB, a dictionary, a replacement table, a collation/replacement table, a collation flag, a replacement flag, or an access pointer. Among these, the content DB, the dictionary, and the replacement table correspond to the content DB 13a, the dictionary 13b, and the replacement table 13e, respectively. The collation/replacement table, the collation flag, the replacement flag, and the access pointer correspond to the collation/replacement table 26a, the collation flag 26b, the replacement flag 26c, and the access pointer 26d, respectively.

Then the CPU 310 reads out the content DB, the dictionary, the replacement table, the collation/replacement table, the collation flag, the replacement flag, or the access pointer and stores them in the RAM 340. The CPU 310 executes the retrieval program using the content DB, the dictionary, the replacement table, the collation/replacement table, the collation flag, the replacement flag, or the access pointer stored in the RAM 340. Regarding pieces of data stored in the RAM 340, all pieces of the data are not necessarily always stored in the RAM 340, and it is sufficient that only a piece of data used for processing is stored in the RAM 340.

The retrieval program described above is not necessarily stored in the ROM from the beginning.

For example, the program may be stored in "portable physical media" such as a flexible disk (FD), a compact disc read only memory (CD-ROM), a digital versatile (DVD) disc, a magneto-optical disc, an integrated circuit (IC) card to be inserted into a computer. Then the computer may read out the program therefrom and execute the program.

Alternatively, the program may be stored in an "other computer (or a server)" that is connected to the computer via a public network, the Internet, a local area network (LAN), a wide area network (WAN), and the like. Then the computer may read out the program therefrom and execute the program.

Fourth Embodiment

A fourth embodiment will be described with reference to FIG. 19. The fourth embodiment may also be implemented using the computer illustrated in FIG. 18, for example.

Figure 19:
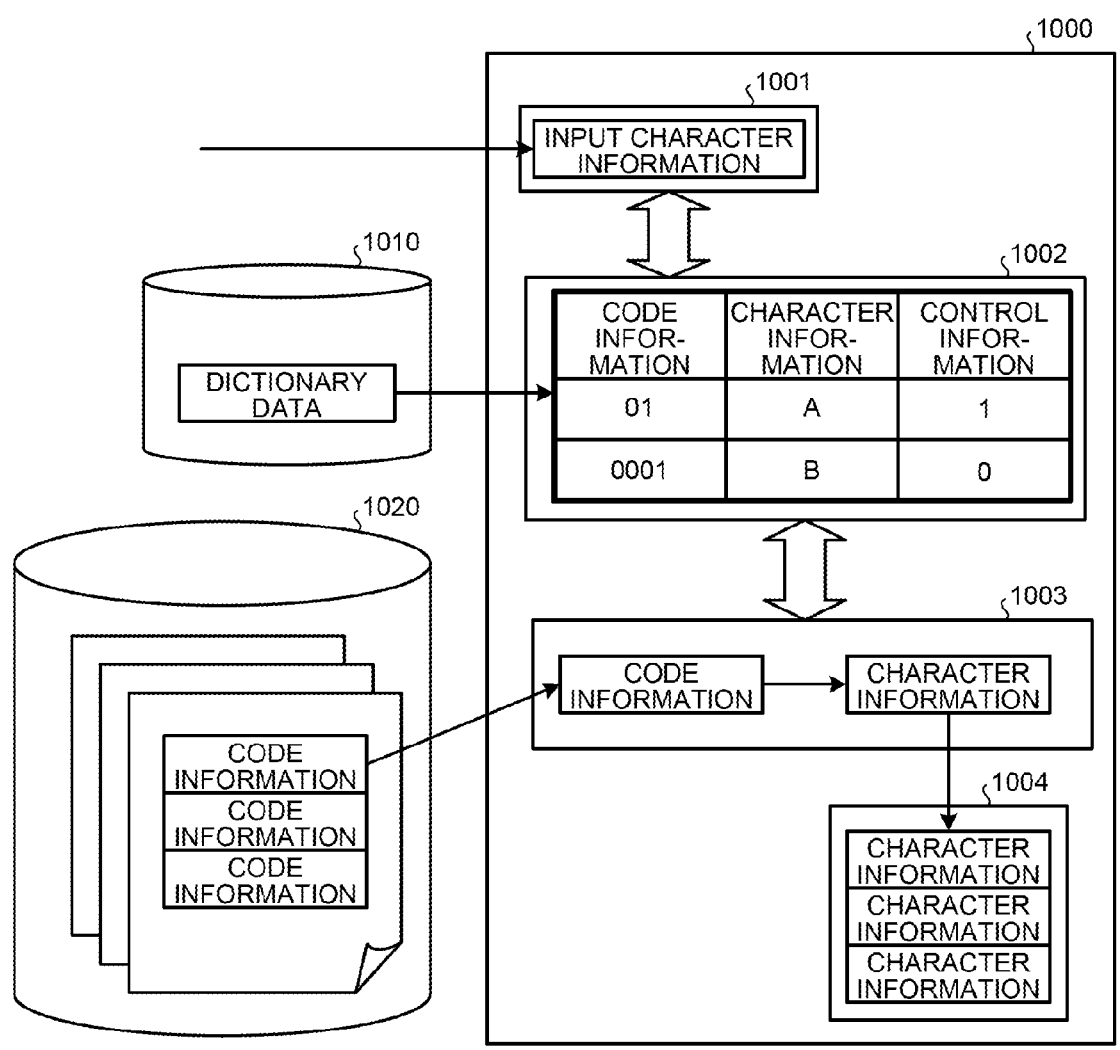
FIG. 19 is a diagram for explaining a relation among pieces of data in a RAM.

FIG. 19 is a diagram explaining a relation among pieces of data in the RAM 340. A memory region 1000 is a memory region that stores therein data used for the processing in the fourth embodiment. A memory region 1001 is a memory region that stores therein input character information input via an input interface. A memory region 1002 is a memory region that stores therein dictionary data used for extension processing and control information used for collation control. A memory region 1003 is a memory region for performing extension processing. A memory region 1004 is a memory region that stores therein extended data.

A dictionary database 1010 is a storage unit that stores therein the dictionary data, and is implemented by the HDD 330 in FIG. 18 and the like, for example. When the extension processing is started, the dictionary data is read out from the dictionary database 1010 to the memory region 1002. The dictionary data is information for associating code information with character information. The code information may be associated with the character information in the dictionary database 1010 in advance. Alternatively, an algorithm for associating the code information with the character information may be stored in the dictionary database to associate the code information with the character information in the memory region 1002 based on the algorithm.

A content database 1020 is a storage unit that stores therein encoded content data, and is implemented by the HDD 330 in FIG. 18 and the like, for example. When retrieval processing of the input character information is performed on the content data stored in the content database 1020, a plurality of pieces of code information included in the content data are sequentially read out and stored in the memory region 1003.

Next, the following describes a flow of processing performed by the CPU 310 illustrated in FIG. 18 on the data illustrated in FIG. 19. When receiving the input character information, the CPU 310 stores the received input character information in the memory region 1001. When the input character information is stored in the memory region 1001, the CPU 310 reads out dictionary information from the dictionary database 1010, and associates the code information with the character information to store them in the memory region 1002.

Next, the CPU 310 extracts the character information included in the input character information from among the character information stored in the memory region 1002. The CPU 310 rewrites, to 1, the control information corresponding to the extracted character information among the control information stored in the memory region 1002. The control information in the memory region 1002 is assumed to be 0 before rewritten by the CPU 310. For example, when the input character information is "APPLE", the control information corresponding to "A" is "1" as illustrated in FIG. 19. Because "B" is not included in "APPLE", the control information corresponding to "B" is "0".

Next, the CPU 310 sequentially reads out the code information from the content database to the memory region 1003. The CPU 310 refers to the dictionary data stored in the memory region 1002, and reads out the character information corresponding to the read-out code information to the memory region 1003 to perform extension processing. When referring to the dictionary data, the CPU 310 also reads out the control information corresponding to the code information that is read out from the content database 1020. The extension processing is additional processing. Control may be performed such that the extension processing is started when the code information corresponding to the control information "1" is read out.

When the read-out control information is "0", the CPU 310 does not start collation processing with the input character information. When the read-out control information is "1", the CPU 310 starts the collation processing with the input character information. For example, when the code information read out from the content database 1020 is code information "01" corresponding to the character information "A", the collation processing is started.

When the collation processing is started, the CPU 310 reads out code information subsequent to the code information corresponding to the control information "1" (for example, code information "01") from the content database 1020. The CPU 310 performs extension processing on the read-out code information with reference to the memory region 1002. Next, the CPU determines whether the character information obtained by the extension processing is included in the input character information with reference to the memory region 1001. When the character information obtained by the extension processing is included in the input character information and there is uncollated character information in the input character information, the CPU 310 repeats the collation processing. In other cases, the CPU 310 finishes the collation processing.

For example, when the code information that is read out after the code information "01" is the code information corresponding to the character information "P", the collation processing on the subsequent code information is started.

The number of times to perform the collation processing with the input character string is reduced by performing the processing as described above, so that it is possible to reduce the processing time of the retrieval processing on the compressed data. Because the collation processing control is performed as described above, it is possible to prevent a situation in which capacity of the extension buffer used for the extension processing cannot be smaller than a data size in a case in which all pieces of the compressed data are extended, due to the control of retrieving an item including a predetermined retrieval character string after all pieces of the compressed data are extended.

According to an aspect, it is possible to reduce processing time of retrieval processing for compressed data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a collation control process comprising:

receiving a retrieval request with a retrieval character string;

adding control information to a region corresponding to code information included in a management region used for extending encoded data when an extension result of the code information matches a first character of the retrieval character string when the encoded data to be retrieved is sequentially extended in response to the retrieval request; and performing collation processing between the retrieval character string and character string information corresponding to data of the extension result of the code information when the control information is added to a partial region corresponding to code information to be extended in the extension.

2. The computer-readable recording medium according to claim 1, the collation control process further comprising:

converting character string information associated with the code information to be extended to input character information associated with the code information, corresponding to a result of the collation processing; and associating the converted input character information with display designation information indicating to highlight the information.

3. The computer-readable recording medium according to claim 1, wherein the collation control process does not perform the collation processing when the control information is not added to a partial region corresponding to the code information.

4. A collation control method executed by a computer, the collation control method comprising:

receiving a retrieval request with a retrieval character string;

adding control information to a region corresponding to code information included in a management region used for extending encoded data when an extension result of the code information matches a first character of the retrieval character string when the encoded data to be retrieved is sequentially extended in response to the retrieval request; and performing collation processing between the retrieval character string and character string information corresponding to data of the extension result of the code information when the control information is added to a partial region corresponding to code information to be extended in the extension.

5. A collation control device comprising:

a processor; and a memory, wherein the processor executes:

receiving a retrieval request with a retrieval character string;

adding control information to a region corresponding to code information included in a management region used for extending encoded data when an extension result of the code information matches a first character of the retrieval character string when the encoded data to be retrieved is sequentially extended in response to the retrieval request; and performing collation processing between the retrieval character string and character string information corresponding to data of the extension result of the code information when the control information is added to a partial region corresponding to code information to be extended in the extension.

* * * * *